United States Patent
Carreira

(10) Patent No.: US 10,659,975 B2
(45) Date of Patent: May 19, 2020

(54) SYSTEMS AND METHODS FOR PROVIDING UNDERGROUND SERVICES IN A NETWORK OF MOVING THINGS, FOR EXAMPLE INCLUDING AUTONOMOUS VEHICLES

(71) Applicant: Veniam, Inc., Mountain View, CA (US)

(72) Inventor: Diogo Carreira, Carrico (PT)

(73) Assignee: VENIAM, INC., Mountain View, CA (US)

( * ) Notice: Subject to any disclaimer, the term of this patent is extended or adjusted under 35 U.S.C. 154(b) by 0 days.

(21) Appl. No.: 16/255,476

(22) Filed: Jan. 23, 2019

(65) Prior Publication Data

US 2019/0230525 A1    Jul. 25, 2019

Related U.S. Application Data

(60) Provisional application No. 62/620,794, filed on Jan. 23, 2018.

(51) Int. Cl.
*H04W 4/021* (2018.01)
*H04W 16/32* (2009.01)
*H04W 84/04* (2009.01)

(52) U.S. Cl.
CPC .......... *H04W 16/32* (2013.01); *H04W 84/045* (2013.01)

(58) Field of Classification Search
CPC ... H04W 16/32; H04W 84/045; H04W 4/021; H04W 84/12; H04W 92/20; H04W 88/08; H04W 4/024; H04W 4/40
See application file for complete search history.

(56) References Cited

U.S. PATENT DOCUMENTS

| | | | |
|---|---|---|---|
| 2002/0080759 A1* | 6/2002 | Harrington | G01S 5/0215 370/338 |
| 2007/0176749 A1* | 8/2007 | Boyd | G01S 5/021 340/10.1 |
| 2008/0042912 A1* | 2/2008 | Lee | H04L 12/4641 343/713 |
| 2018/0041867 A1* | 2/2018 | Wang | H04W 4/023 |
| 2019/0090174 A1 | 3/2019 | Rocci et al. | |

\* cited by examiner

*Primary Examiner* — Christopher M Brandt
(74) *Attorney, Agent, or Firm* — McAndrews, Held & Malloy, Ltd.

(57) ABSTRACT

Communication network architectures, systems and methods for providing underground services in a network of moving things, for example but not necessarily including autonomous vehicles. As a non-limiting example, various aspects of this disclosure provide communication network architectures, systems, and methods for providing communication services, location services, safety services, vehicle guidance services, etc., in underground or other environments in which direct communication with entities outside such environment is not possible.

20 Claims, 15 Drawing Sheets

SYSTEMS AND METHODS FOR PROVIDING UNDERGROUND SERVICES IN A NETWORK OF MOVING THINGS, FOR EXAMPLE INCLUDING AUTONOMOUS VEHICLES

CROSS-REFERENCE TO RELATED APPLICATIONS/INCORPORATION BY REFERENCE

This patent application makes reference to, claims priority to, and claims benefit from U.S. Provisional Patent Application Ser. No. 62/620,794, filed on Jan. 23, 2018, and titled "Systems and Methods for Collecting Sensor Data in a Network of Moving Things," which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; U.S. patent application Ser. No. 15/213,269, filed on Jul. 18, 2016, and titled "Systems and Methods for Collecting Sensor Data in a Network of Moving Things"; and U.S. patent application Ser. No. 15/682,886, filed Aug. 22, 2017, and titled "Systems and Methods for Multi-Vehicle Adaptive Data Collection in a Network of Moving Things, for Example Including Autonomous Vehicles"; U.S. patent application Ser. No. 15/633,201, filed on Jun. 26, 2017, titled "Systems and Methods for Multiple-Path Delay Tolerant Communication in a Network of Moving Things, for Example Including a Network of Autonomous Vehicles," U.S. patent application Ser. No. 15/789,778, filed on Oct. 20, 2017, and titled "Systems and Methods for Utilizing Mobile Access Points as Fixed Access Points in a Network of Moving Things, for Example Including Autonomous Vehicles"; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.), for example in underground environments, environments deep within building structures, etc. Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
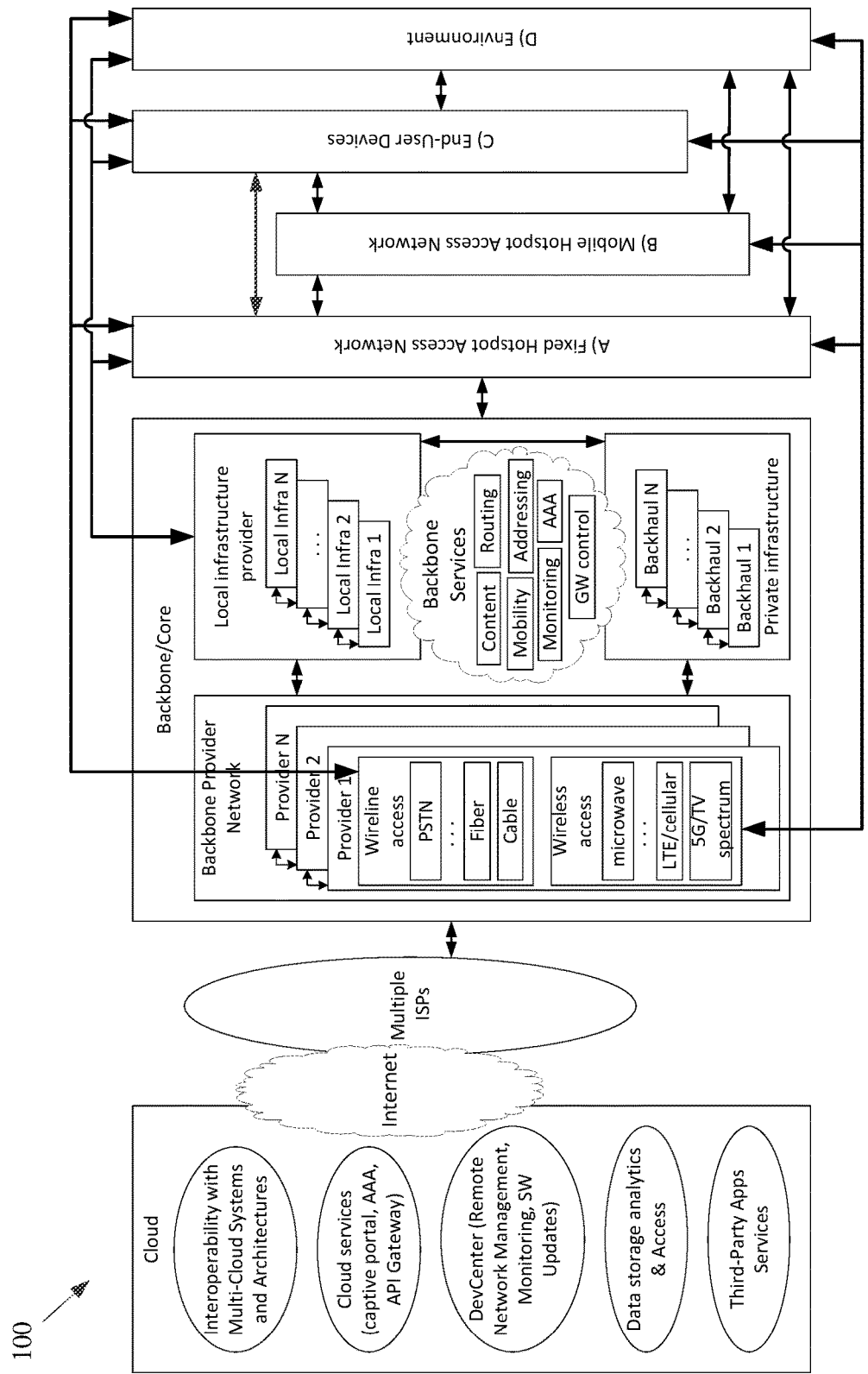
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, method steps, nodes, networks, and/or network components 200, 300, 400, 500-570, 600, 700, 800, 900, 1000, and 1100, shown and/or discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
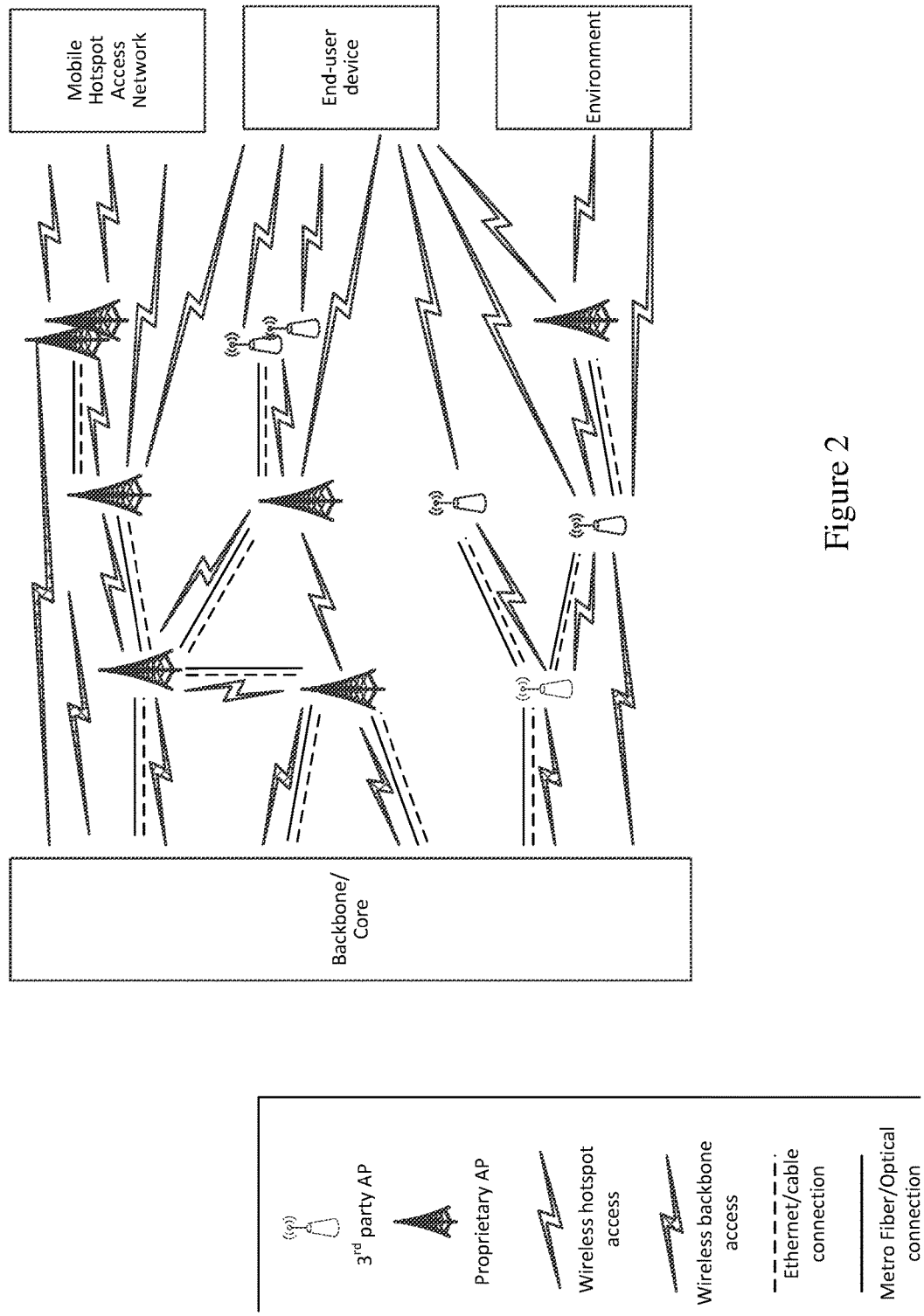
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, method steps, nodes, networks, and/or network components 100, 300, 400, 500-570, 600, 700, 800, 900, 1000, and 1100, shown and/or discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
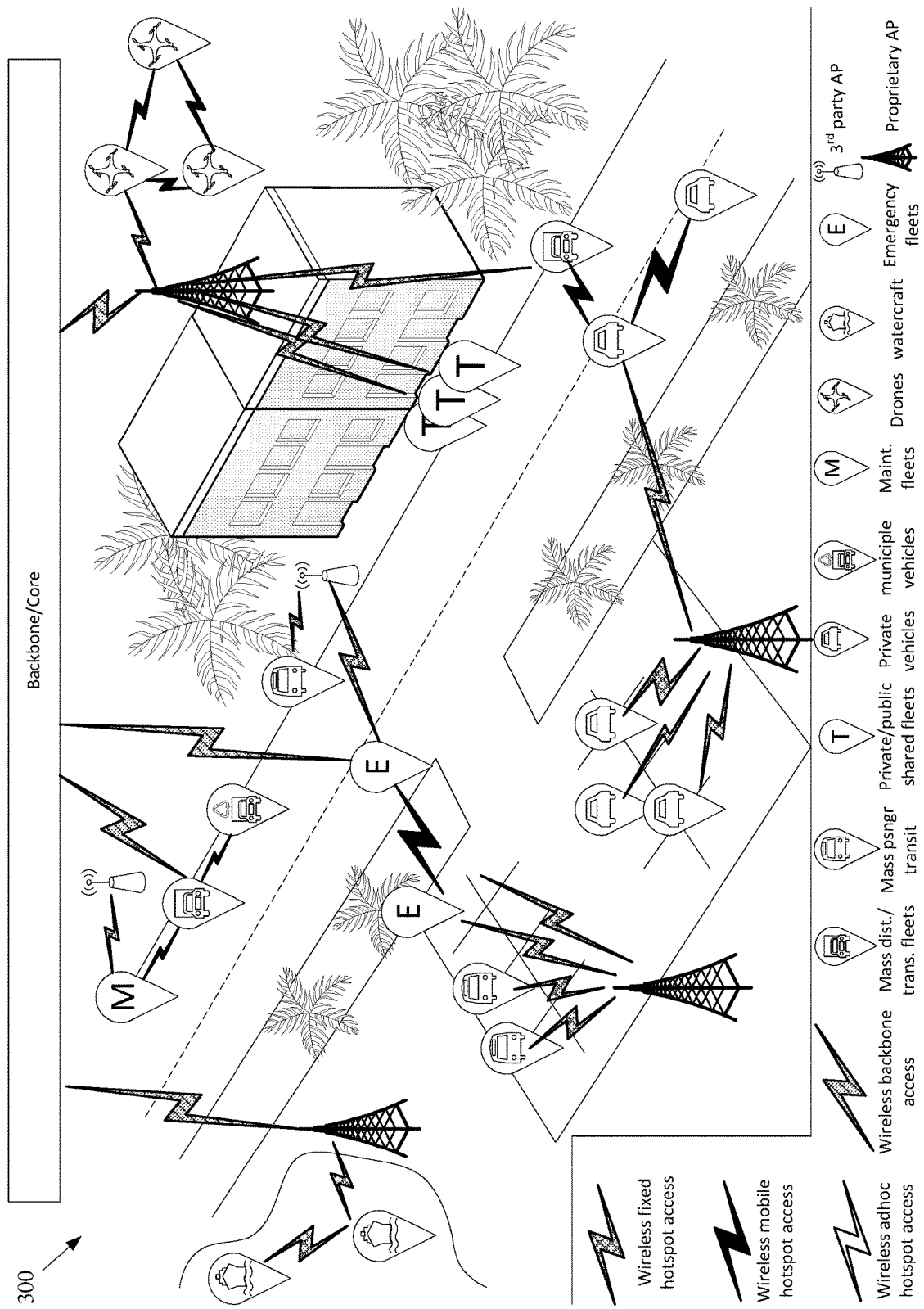
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, method steps, nodes, networks, and/or network components 100, 200, 400, 500-570, 600, 700, 800, 900, 1000, and 1100, shown and/or discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
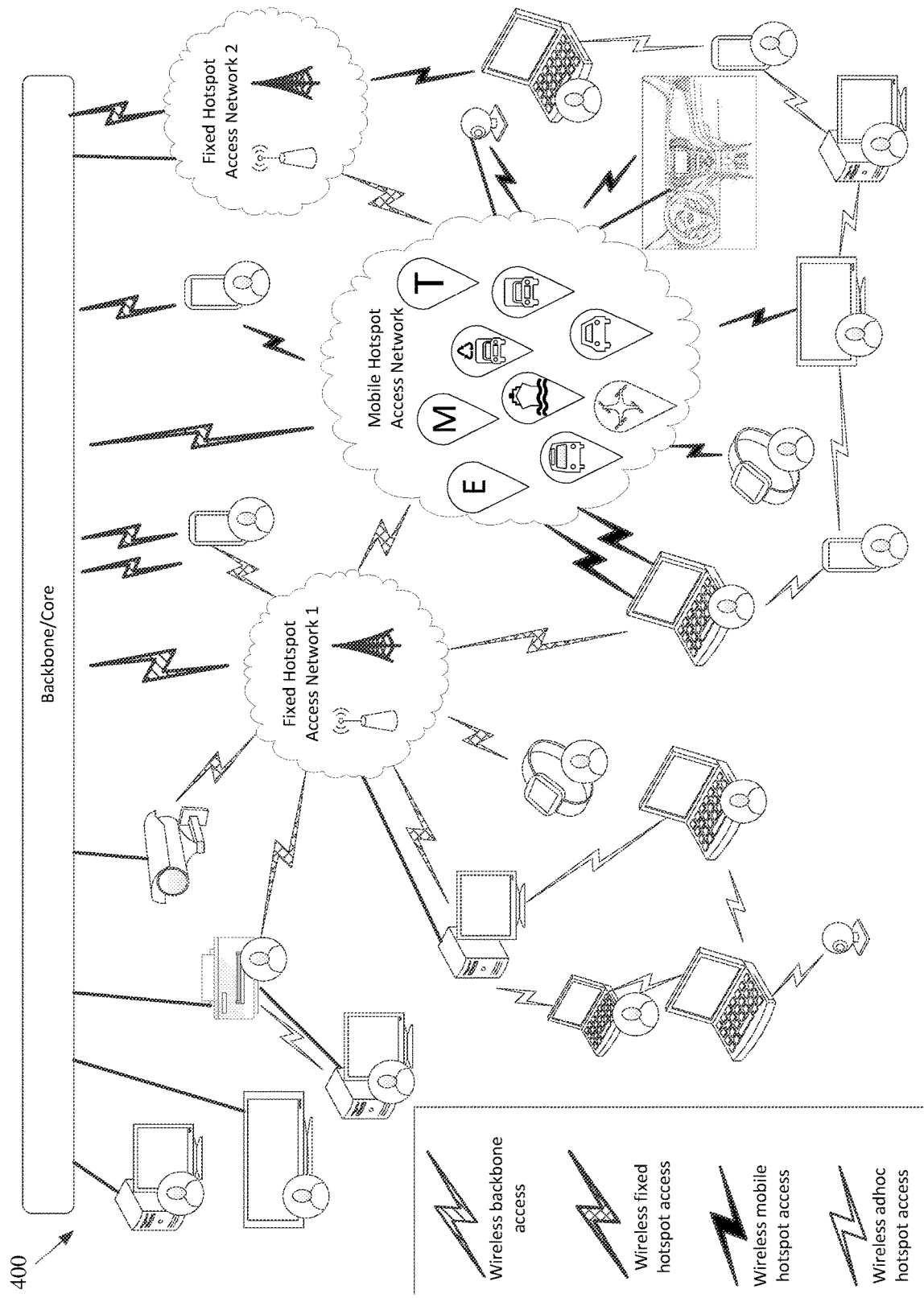
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, method steps, nodes, networks, and/or network components 100, 200, 300, 500-570, 600, 700, 800, 900, 1000, and 1100, shown and/or discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
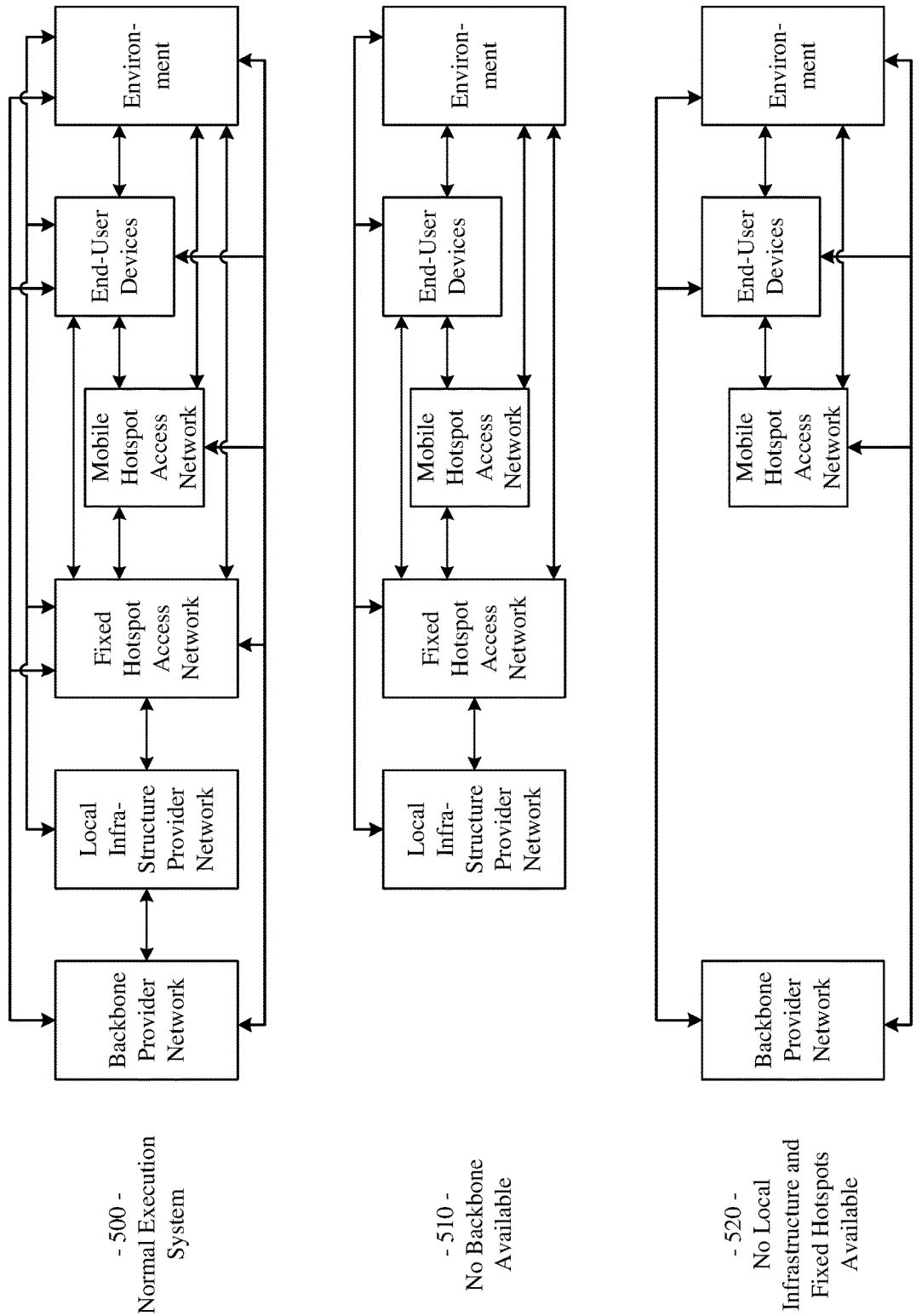
FIGS. 5A-5C show a plurality of network configurations illustrating the flexibility and/or and resiliency of a communication network, in accordance with various aspects of this disclosure.
Figure 5B:
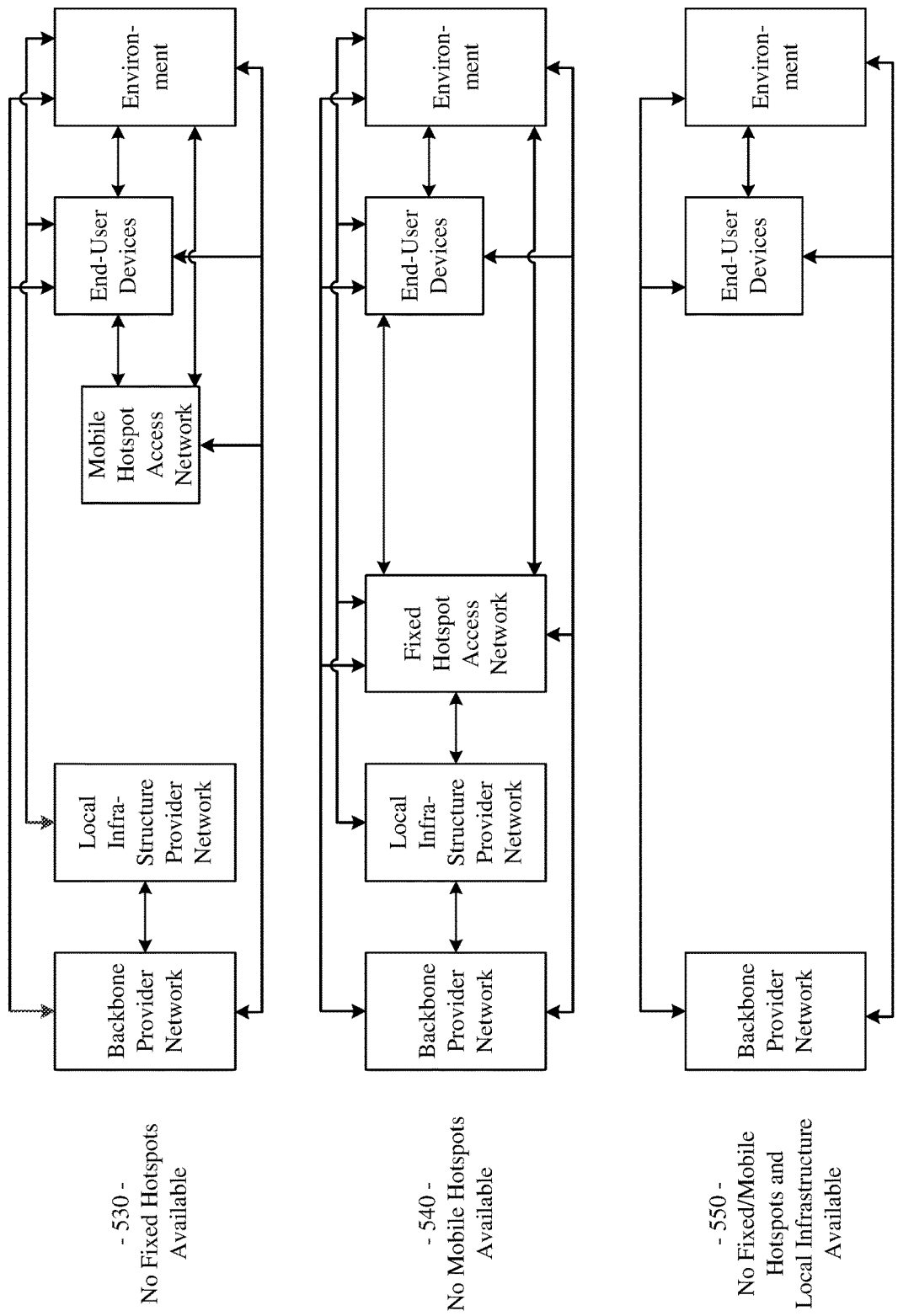
Figure 5C:
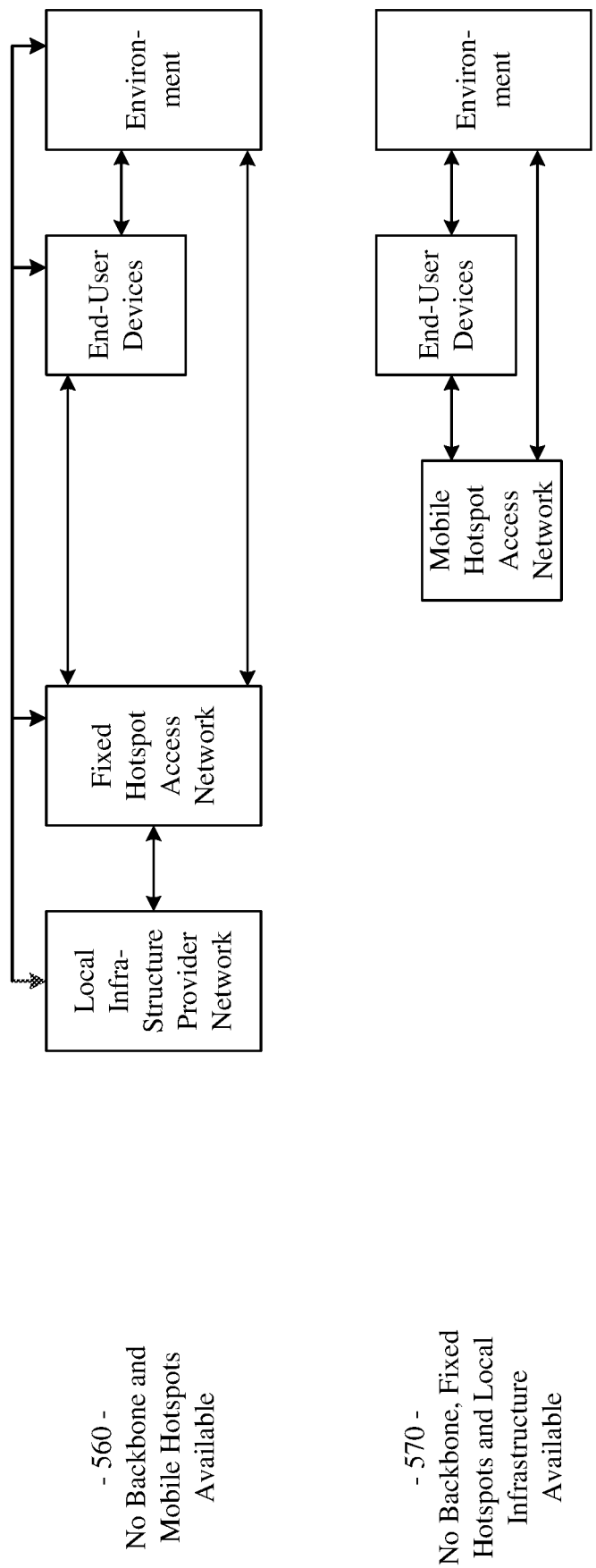

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, method steps, nodes, networks, and/or network components 100, 200, 300, 400, 500-570, 600, 700, 800, 900, 1000, and 1100, shown and/or discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
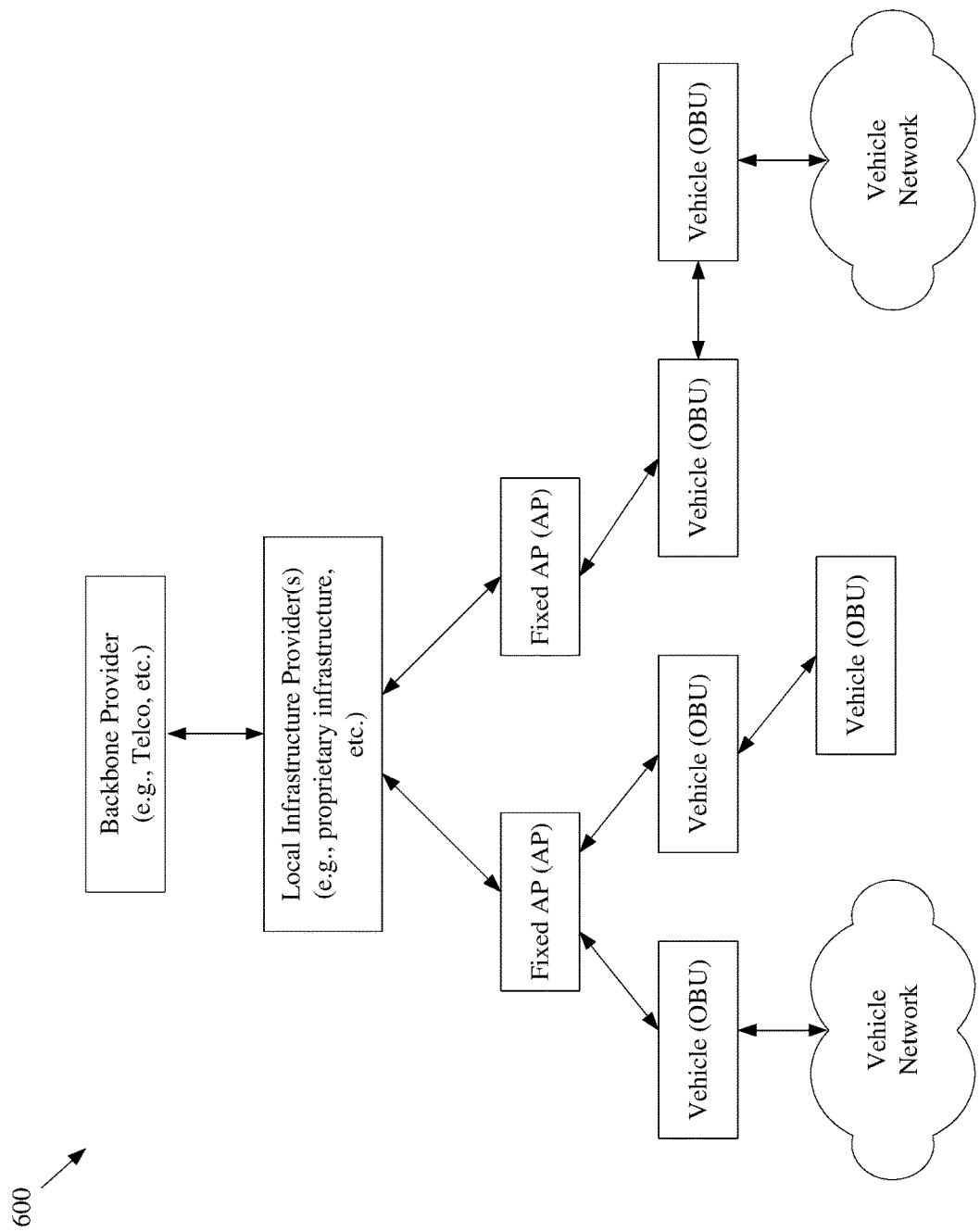
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, method steps, nodes, networks, and/or network components 100, 200, 300, 400, 500-570, 700, 800, 900, 1000, and 1100, shown and/or discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

Figure 7:
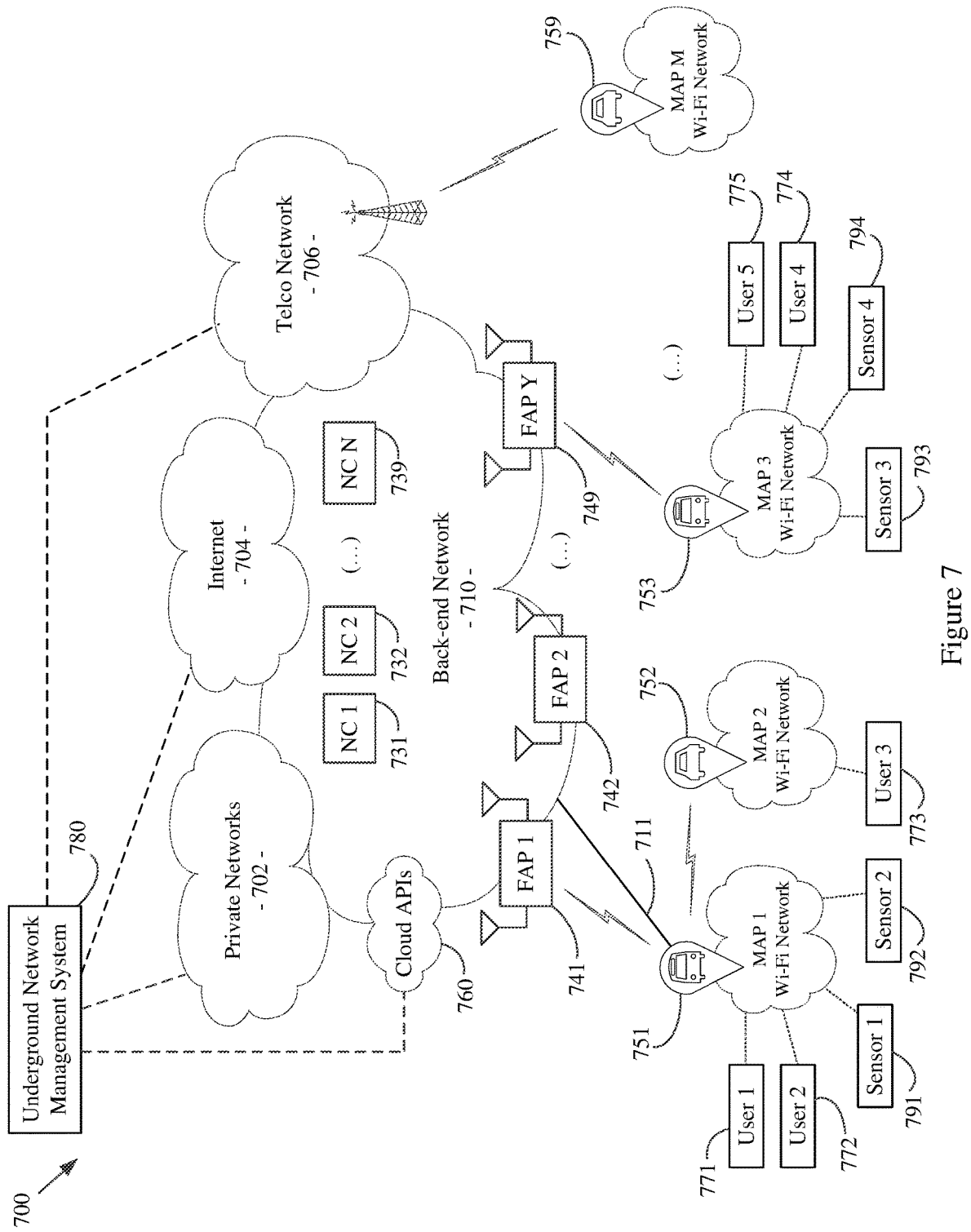
FIG. 7 shows a block diagram of an example communication network, in accordance with various aspects of the present disclosure.

FIG. 7 shows still another block diagram of an example communication network 700, in accordance with various aspects of the present disclosure. The example network 700 may, for example, share any or all characteristics with the other example methods, method steps, nodes, networks, and/or network components 100, 200, 300, 400, 500-570, 600, 800, 900, 1000, and 1100, shown and/or discussed herein. Notably, the example communication network 700 shows a plurality of vehicles (or Mobile APs, or OBUs), each communicatively coupled to a Fixed AP (or RSU), where each Mobile AP may provide network access to a vehicle network (e.g., comprising other vehicles or vehicle networks, user devices, sensor devices, etc.), for example a Wi-Fi network to which end user devices may connect, with which communication with sensors may be performed, with which communication with control circuitry may be performed, etc. The Mobile APs (or vehicles in which the Mobile APs are installed) may also, for example, have access to information from any of a wide array of sensors (e.g., cameras, microphones, gas or particle sensors, weather sensors, pressure sensors, depth sensors, impulse sensors or accelerometers or vibration sensors, velocity sensors, slip detectors, temperature sensors, position or location or orientation sensors, moisture detectors, pressure sensors, weight sensors, door or lid sensors, etc.). The Mobile APs may also, for example, have access to any of a variety of sensors and/or processors that measure network conditions or performance (e.g., signal-to-noise ratio, error rate or retransmission rate, signal strength, channel loading or utilization, quality of service, etc.). The Mobile APs may, for example, gather (or collect) information from such sensors, make various autonomous decisions based at least in part on the gathered information, communicate such information to controllers (e.g., local and/or central access point positioning systems, controllers of vehicles, central network controllers and/or databases, etc.), etc. Many non-limiting examples of such operation are provided herein.

As shown in FIG. 7, an Underground Network Management System (UNMS) 780 may be communicatively coupled to the network (e.g., to the Cloud, to the infrastructure, to any of a variety of public and/or private networks, etc.) in any of a variety of manners. The UNMS 780 or any portion thereof may, for example, be implemented in a Network Operations Center (NOC), a Mining Operation Control Center, an Underground Travel Control Center, a general Cloud server, a Mobile AP, a Fixed AP, a Network Controller, any node discussed herein, etc. For example, the UNMS 780 may be connected to a Cloud of a network operator, for example a Back-end Network 710 (e.g., through one or more APIs 760, via one or more Private Networks 702, via the Internet 704, via one or more Telco Networks 706, any combination thereof, etc.). For example, the UNMS 780 may be communicatively coupled to any of the nodes via a backhaul network. Note that although various aspects of the present disclosure will be provided herein in the context of an underground scenario, the scope of this disclosure is not limited thereto. For example, any or all of the aspects of the present disclosure may be implemented in an above-ground scenario, for example in which there is limited communication with the outside world.

Also as shown in FIG. 7, a vehicle network may be connected (e.g., communicatively coupled, directly or indirectly) to one or more local user (or client) devices 771, 772, 773, 774, and 775, any of the variety of sensors 791, 792, 793, and 794, etc. Note that any or all of such user devices and/or sensors may be on-board a corresponding Mobile AP, may be on-board a same vehicle as a corresponding Mobile AP, may be separated from a corresponding Mobile AP and/or corresponding vehicle but within communication range, etc.

The vehicle network may, for example, comprise any or all of the nodes discussed herein. For example, the vehicle network may comprise one or more Network Controllers (NCs) (e.g., NC 1 731, NC 2 732, . . . , NC N 739, etc.), one or more Fixed APs (e.g., FAP 1 741, FAP 2 742, . . . , FAP Y 749, etc.), one or more Mobile APs (e.g., MAP 1 751, MAP 2 752, MAP 3 753, . . . , MAP M 759, etc.), etc. Such nodes may, for example, be communicatively coupled in any of the manners discussed herein. Note that, as discussed herein, a Mobile AP (e.g., as shown at example MAP 1 751 of FIG. 7) may at times connect to the network (e.g., to any node thereof, etc.) via a hard link 711 (e.g., via wire, via an optical fiber (or tether), etc.). Such a hard link 711 may, for example, be utilized when a Mobile AP (or a vehicle to which the Mobile AP is attached) is parked, and the Mobile AP is operating as a Fixed AP. Also for example, such a hard link 711 may be utilized in conjunction with a wireless link between the Mobile AP and a Fixed AP (or other Mobile AP). Note that in various other example implementations, the Mobile AP might only communicate wirelessly with the network 700.

As shown in FIG. 7, the network of moving things (NMT) may comprise a plurality of vehicles, each with a respective local vehicle network that may be coupled to other vehicle networks, user devices (e.g., smart phones, personal computing devices, smart watches, scanners, health monitors, etc.), smart containers or cargo systems comprising any of a variety of sensors (e.g., container sensors, environmental sensors, position sensors, inertial sensors, cameras, microphones, temperature sensors, humidity sensors, gas and/or particle sensors, weight sensors, light sensors, etc.), sensors apart from containers (e.g., container sensors, environmental sensors, position sensors, inertial sensors, cameras, microphones, temperature and/or infrared sensors, humidity sensors, gas and/or particle sensors, weight sensors, shock or vibration sensors, accelerometers, etc.), vehicle control sensors (e.g., engine sensors, temperature sensors, road condition sensors, speed sensors, location sensors, shock sensors, vibration sensors, wheel rotation sensors, accelerometers, velocity sensors, pressure sensors, etc.), etc.

Various aspects of the present disclosure address the unique communication challenges presented in underground environments (e.g., mining environments, tunnel environments, basement environments, railway operations, parking lots, industrial warehouses, underground construction sites, etc.). For example, such environments may have no (or limited) physical communication network infrastructure, no (or limited) cellular communication availability, no (or limited) GPS (or other positioning system) availability, etc. Also, for example, such environments may have a physical topology that changes over time (e.g., growing or closing tunnels, utilization of different shafts or tunnels over time, etc.). Additionally, for example, such environments may comprise physical constraints that make operation of a traditional physical infrastructure impossible, impractical, or commercial infeasible.

Such environmental characteristics provide many challenges and opportunities for the improvement of communication and/or location services (e.g., location of people, material, vehicles, etc.), improvement of process optimization (e.g., mining operation optimization, material and/or person transportation optimization, etc.), improvement of safety operations, etc.

Accordingly, various aspects of the present disclosure address such challenges, also providing a scalable market solution for such environments. For example, systems and methods implemented in accordance with various aspects of the present disclosure overcome the various environmental constraints, for example providing (and/or improving) such services utilizing a vehicle mesh solution that leverages multiple wireless technologies (e.g., 802.11a, 801.11b/g/n, 802.11ac, DSRC, Bluetooth, Wi-Fi, near field communication, etc.) to provide a full-stack solution that includes any or all of: asset location services (e.g., people, vehicles, tools, materials, fuel, etc.), vehicle (or client or sensor) data management, real-time or near real-time connectivity (e.g., internal communications (e.g., telephone, voice messaging, video conferencing, text or other messaging, etc.), intranet access to corporate services, safety services, operational optimization services, etc.).

Various aspects of the present disclosure will now be presented in reference to FIGS. 8 and 9A-9E.

Figure 8:
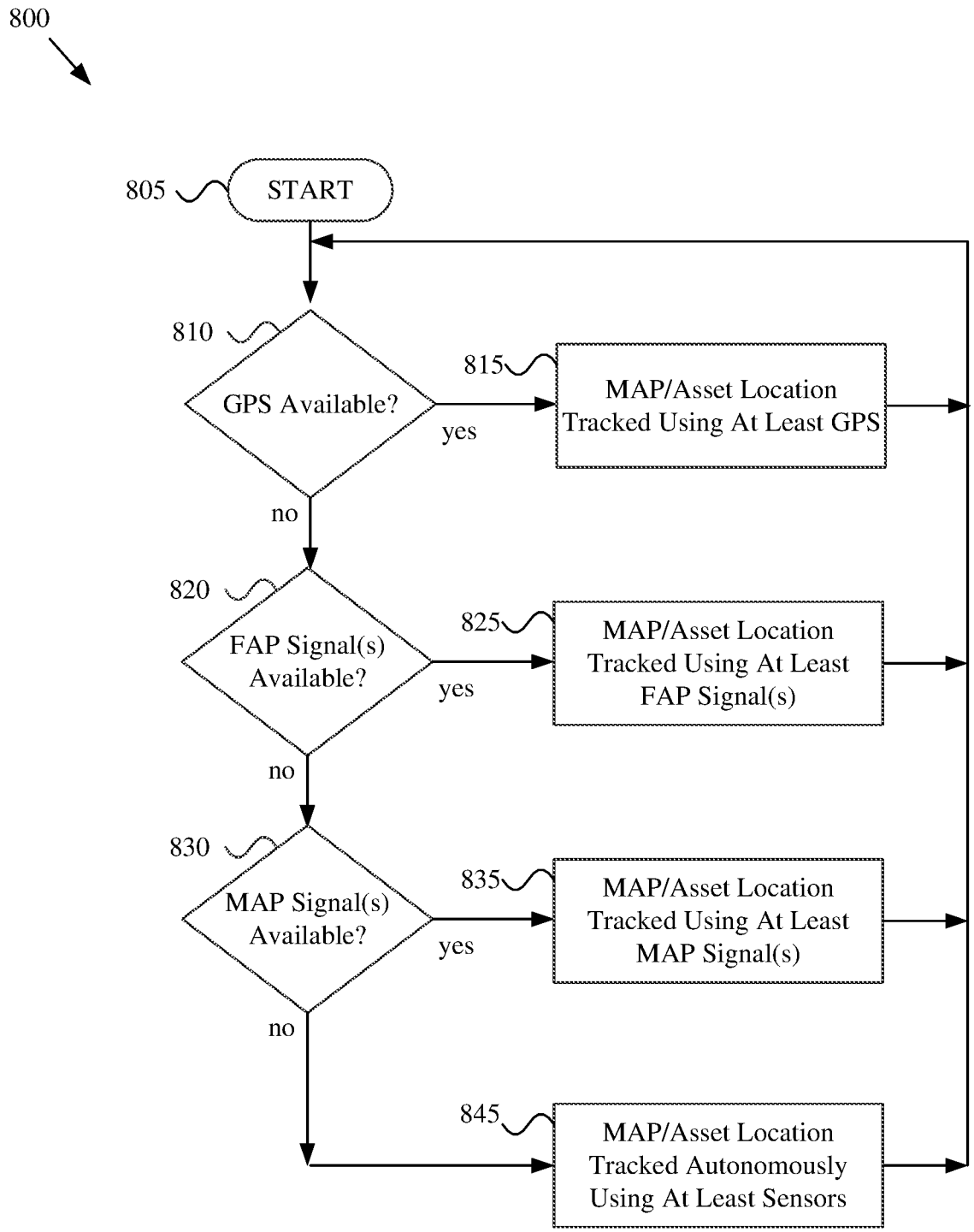
FIG. 8 shows a flow diagram of an example method of providing underground services, in accordance with various aspects of the present disclosure.

FIG. 8 shows a flow diagram of an example method of providing underground services, in accordance with various aspects of the present disclosure. The example method 800 may, for example, share any or all characteristics with the other example methods, method steps, nodes, networks, and/or network components 100, 200, 300, 400, 500-570, 600, 700, 900, 1000, and 1100, shown and/or discussed herein. FIGS. 9A-9E show a time sequence of diagrams of an example communication scenario (or network), in accordance with various aspects of the present disclosure. The example scenarios (or networks) 900 (e.g., including scenarios or networks 900A-900E) may, for example, share any or all characteristics with the other example methods, method steps, nodes, networks, and/or network components 100, 200, 300, 400, 500-570, 600, 700, 800, 1000, and 1100, shown and/or discussed herein.

The example method 800 may begin executing at block 805. The example method 800 may begin executing in response to any of a variety of causes or conditions, non-limiting examples of which are provided herein. For example, the example method 800 may begin executing in response to a power-up or reset condition of a network component (e.g., a Mobile AP or vehicle associated therewith, a UNMS, any of the communication network nodes discussed herein, etc.). Also for example, the example method 800 may begin executing in response to a vehicle embarking on a movement plan or route, in response to a user command to begin, upon a vehicle entering an area proximate an area with known communication challenges (e.g., as a vehicle approaches a tunnel, mine shaft, subterranean parking garage, etc.), etc. In general, the example method 800 may begin executing in response to any of a variety of causes or conditions. Accordingly, the scope of this disclosure should not be limited by characteristics of any particular causes or conditions.

The example method 800 may, at block 810, comprise determine whether the Global Positioning System (GPS) or any other global positioning system (e.g., GLONASS, Galileo, etc.) is available. If it is determined that the GPS system (or other positioning system) is available, then block 810 directs execution flow of the example method 800 to block 815. If, however, it is determined that the GPS system (or other positioning system) is not available, then block 810 directs execution flow of the example method 800 to block 820.

At block 815, the example method 800 may, for example, comprise determining location (or position) based, at least in part, on the GPS. Block 815 may, for example, comprise determining location (or position) based also on other signals, for example utilizing other information (e.g., wireless signal characteristics, sensed conditions, etc.) to enhance (or assist with or augment) the GPS determination. For example, in a scenario in which a GPS-based location is determined, block 815 may fine tune the determined location based on signals from networks at known locations, based on wireless signal triangulation, based on planned vehicle route information and/or vehicle movement sensors, based on user or client device movement sensors, etc. For example, although the GPS-based determination may provide a baseline location, such location may be shifted (or fine-tuned) based on other information.

Block 815 may comprise determining the location of a vehicle (or Mobile AP there), determining the location of one or more users (or client devices) in or around the vehicle, determining the location of one or more resources (e.g., vehicle resources, tools, devices, equipment, sensors, energy resources, etc.) in or around the vehicle, etc. For example, the location (or position) of the vehicle may serve as a starting point to a location vector directed to such other entities. Such vector may, for example, be determined based on signal strength (e.g., as a function of Wi-Fi signal strength as measured at the Mobile AP (or power control bit information, etc.), as a function of user device motion detection devices (e.g., step counters, accelerometers, gyroscope sensors, etc.), as a function of various other sensors (e.g., motion sensors, cameras, microphones, IR sensors, etc.), etc.

The example method 800 may, at block 820, comprise determine whether one or more Fixed AP signals are available (detectable). If it is determined that one or more Fixed AP signals are available, then block 820 directs execution flow of the example method 800 to block 825. If, however, it is determined that a Fixed AP signal is not available, then block 820 directs execution flow of the example method 800 to block 830.

At block 825, the example method 800 may, for example, comprise determining location (or position) based, at least in part, on Fixed AP signal characteristics.

Figure 9A:
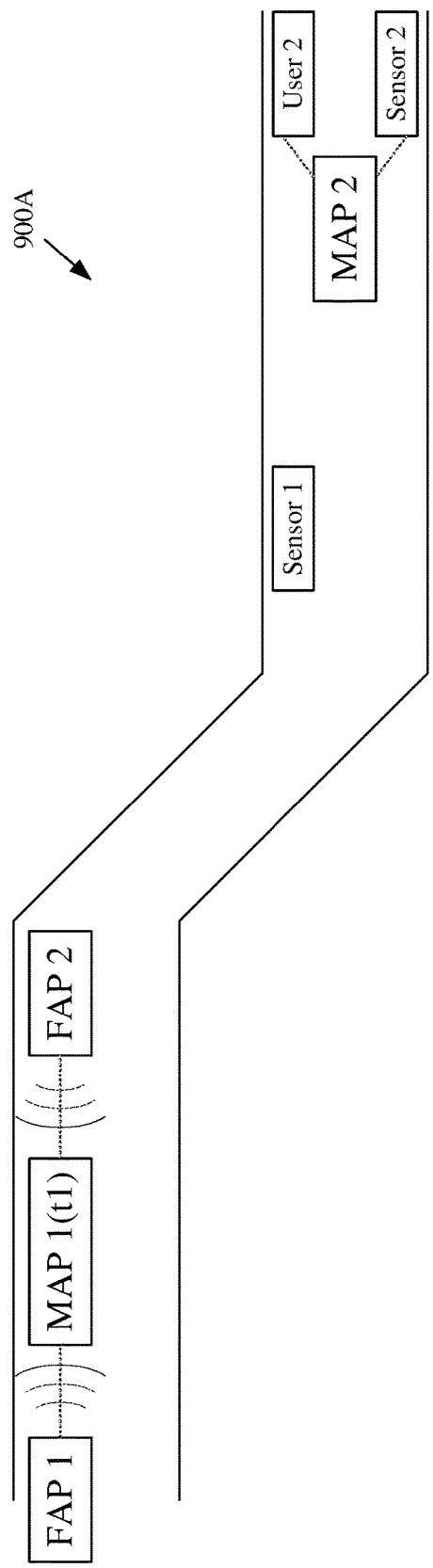
FIGS. 9A-9E show a time sequence of diagrams of an example communication scenario, in accordance with various aspects of the present disclosure.

For example, referring to the example scenario 900A shown in FIG. 9A, block 825 may comprise determining the location (or position) of MAP 1 (e.g., at time t1) based on the signal strength of signals (e.g., DSRC signals, Wi-Fi signals, etc.) from and/or to FAP 1. For example, by experimentation (or empirically) or theoretically, there may be a known relationship between distance from FAP 1 and signal strength. Thus, block 825 may comprise adding such a distance to the location of FAP 1 to estimate the location of MAP 1 at time t1 (e.g., knowing that MAP 1 is in the tunnel since its GPS signal reception has ceased. Note that MAP 1 (or MAP 2) may, for example, be an autonomous vehicle and/or a user-operated vehicle.

Additionally, in the example scenario 900A of FIG. 9A, MAP 1 is also within communication range (or at least able to detect a signal) of FAP 2. Thus, block 825 may combine a first determination of the distance between MAP 1 and FAP 1 with a second determination of the distance between MAP 1 and FAP 2 to estimate the position of MAP 1. Note that upon any determination of location discussed herein, such determination may be communicated to any other node discussed herein (e.g., to a UNMS, etc.).

Figure 9B:
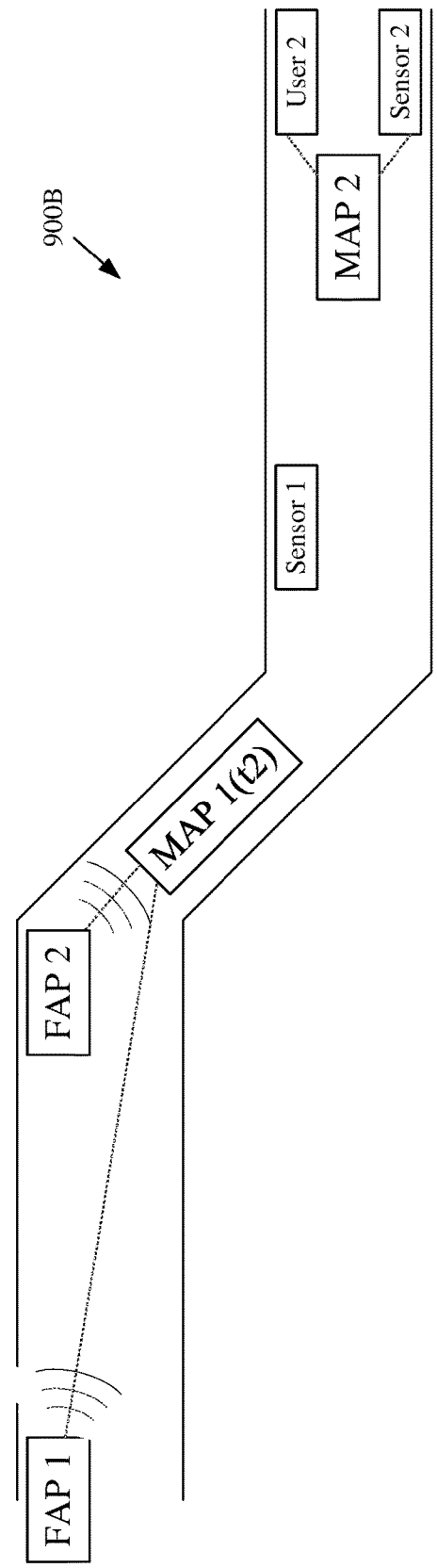

Continuing the example of FIGS. 9A-9E, as shown in the scenario 900B of FIG. 9B, as MAP 1 continues on its path past FAP 2, MAP 1 may still be within communication range (or at least be able to detect a signal) of both FAP 1 and FAP 2. In such a scenario, block 825 may again process the signals to and/or from FAP 1 and FAP 2 to estimate a location of MAP 1 at time t2.

Figure 9C:
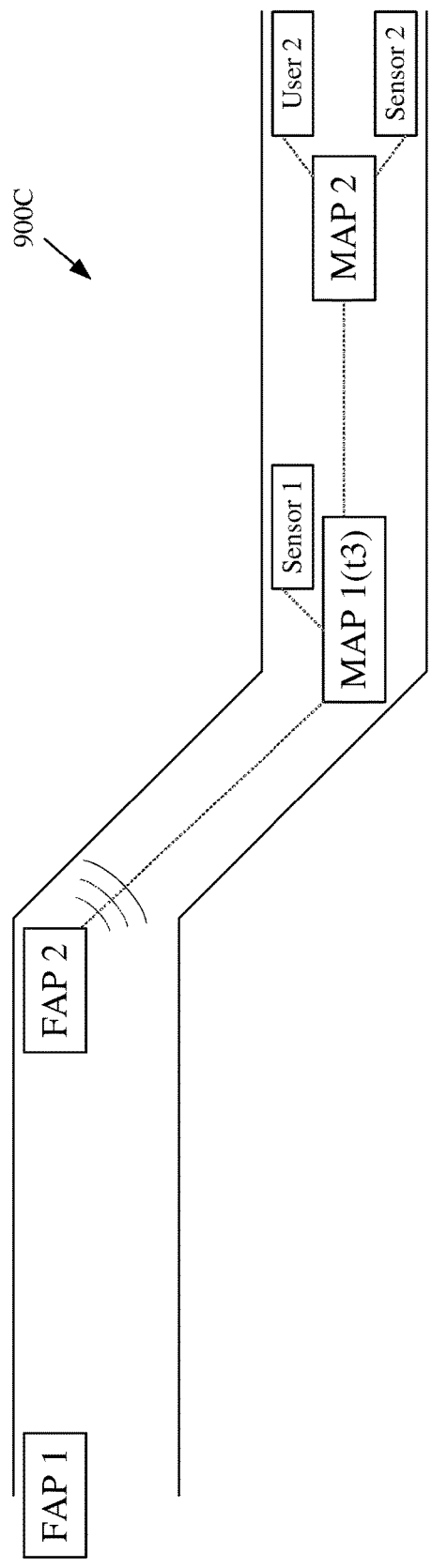
Figure 9D:
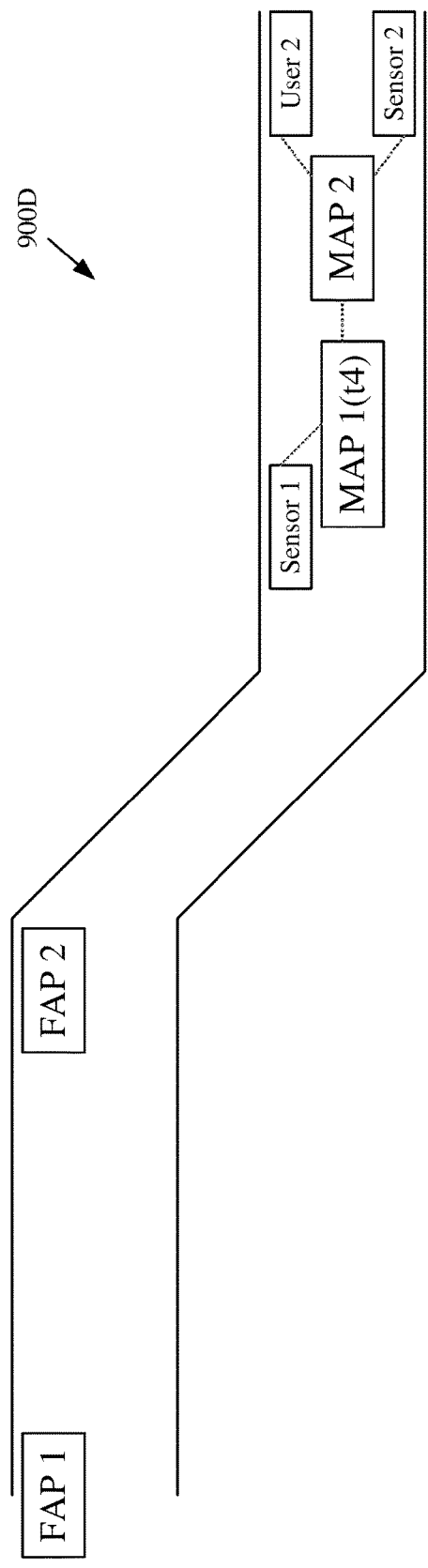

Continuing the example of FIGS. 9A-9E, as shown in the scenario 900C of FIG. 9C, as MAP 1 continues on its path further past FAP 2, MAP 1 (at time t3) ceases to detect the signal of (or communicate with) FAP 1. However, since MAP 1 continued to communicate with (or received a signal from) FAP 2, block 825 may determine the distance of MAP 1 from FAP 2 based on signal strength (and based on the fact that a signal associated with FAP 1 is not available).

As shown in FIG. 900C, at time t3, MAP 1 also comes within communication range of Sensor 1 and MAP 2. Thus, to the extent that any helpful information may be gleaned from Sensor 1 and MAP 2, block 825 may utilize such information to augment the location determination based on FAP signal strength. For example, as discussed herein with regard to block 815, block 825 may also comprise utilizing any of a variety of different types of information (e.g., in addition to wireless signal strength information) to fine tune (or augment) the location determination.

Block 825 may, for example, comprise determining location (or position) based also on other signals, for example utilizing other information (e.g., wireless signal characteristics, sensed conditions, etc.) to enhance (or assist with or augment) the FAP-based determination. For example, in a scenario in which a FAP-based location is determined, block 825 may fine tune the determined location based on planned vehicle route information and/or vehicle movement sensors, based on user or client device movement sensors, based on a known location of sensors (e.g., the Sensor 1 location), etc. For example, although the FAP-based determination may provide a baseline location, such location may be shifted (or fine-tuned) based on other information.

For example, in the example scenario 900C shown in FIG. 9C, though block 825 may determine a baseline location of MAP 1 at time t3 based on FAP 2 signal strength (signals to or from FAP 2), block 825 may also fine tune the determined location based on a known location of Sensor 1 and detected signal strength of Sensor 1, based on an estimated location of MAP 2 and detected signals strength of MAP 2, etc.

Block 825 may comprise determining the location of a vehicle (or Mobile AP there), determining the location of one or more users (or client devices) in or around the vehicle, determining the location of one or more resources (e.g., vehicle resources, tools, devices, equipment, sensors, energy resources, etc.) in or around the vehicle, etc. For example, the location (or position) of the vehicle may service as a starting point to a location vector directed to such other entities. Such vector may, for example, be determined based on signal strength (e.g., as a function of Wi-Fi signal strength (or RSSI) as measured at the Mobile AP (or power control bit information for signal power control, etc.), as a function of user device motion detection devices (e.g., step counters, accelerometers, gyroscope sensors, etc.), as a function of various other sensors (e.g., motion sensors, cameras, microphones, IR sensors, etc.), etc. For example, in the example scenario 900C, MAP 1 may determine a location (or position) vector to MAP 2 based on signal strength between MAP 1 and MAP 2. Also for example, MAP 1 may receive information from MAP 2 regarding the location of User 2, information received from Sensor 2, etc. Thus, MAP 1 may form a compound location vector to User 2. Note that any of the nodes discussed herein (e.g., user nodes, sensor nodes, MAP nodes, vehicles, tools, etc.) may be associated with a unique identifier (e.g., MAC address, etc.), which may in turn be utilized for tracking. For example, in the scenario 900C, based on signal strength of a personal communication device of User 2 as determined at MAP 1 and MAP 2, and/or based on movement sensors of the personal communication device, a generally accurate vector from MAP 2 to User 2 may be determined.

Note that in an example scenario in which both MAP 1 and MAP 2 are within communication range of a device of User 2 (and/or at least within range of signal detection), the position of User 2 may be triangulated, for example based on signal strengths and estimated positions of MAP 1 and MAP 2. Similarly, if User 2 is at a known location (e.g., at a station at a fixed known location, next to a sensor at a fixed and known location, using equipment that is positioned at a known location, etc.), the location of User 2 may be utilized to more specifically identify the location of MAP 1 and/or MAP 2.

Note that after MAP 1 determines the location of MAP 2, MAP 1 may communicate such determination to any other node discussed herein, for example to a UNMS (e.g., through any number of intermediate nodes), to MAP 2, etc. For example, MAP 1 may, upon determining where MAP 2 is positioned, communicate information of such determination upstream (e.g., to a UNMS or other server) and/or downstream (e.g., to MAP 2).

Note that in the scenario 900C shown in FIG. 9C, MAP 1 may receive information from Sensor 1 and from MAP 2 (e.g., Sensor 2 information, User 2 information, etc.). As this point, since MAP 1 is in communication with FAP 2, MAP may communicate any or all of such information to the communication backbone through FAP 2 and FAP 1. Note that such information may be communicated in a delay-tolerant manner, determining which information is to be communicated in real-time (or immediately) (e.g., emergency or safety information, real-time person-to-person communication, vehicle control information, etc.) and which information may be efficiently communicated later in a delay-tolerant manner (e.g., mundane sensor reading information, worker notes, non-critical vehicle condition information, etc.).

In an example scenario, User 2 may, for example, utilize a personal communication device to connect wirelessly to MAP 2. User 2 may, for example, be communicating with a controller (e.g., at a server) via the Internet. Information from User 2 may thus flow through MAP 2, through MAP 1, through FAP 2, through FAP 1, and through a communication backbone to the Internet. In such example scenario, each of the nodes may have a routing table such that, upon the arrival of return information for User 2, each of such nodes properly routes the returned information in the reverse direction back to User 2.

The example method 800 may, at block 830, comprise determine whether one or more Mobile AP signals are available (detectable). If it is determined that one or more Mobile AP signals are available, then block 830 directs execution flow of the example method 800 to block 835. If, however, it is determined that a Mobile AP signal is not available, then block 830 directs execution flow of the example method 800 to block 845.

At block 835, the example method 800 may, for example, comprise determining location (or position) based, at least in part, on Mobile AP signal characteristics. For example, referring to the example scenario 900D shown in FIG. 9D, MAP 1 has no GPS availability and no Fixed APs are within range. In the example scenario 900D, however, MAP 1 is still in communication range of other devices, and such communication may be utilized, at least in part, to determine the location of MAP 1 and/or other nodes or devices. For example, as discussed herein, upon determining a relatively reliable location or MAP 2 (e.g., based at least in part on a signal from FAP 2, based on a signal from Sensor 1, etc.), MAP 1 may communicate such information to MAP 2. If MAP 2 is relatively immobile and/or otherwise knows its location to a relatively high degree of certainty, the MAP 2 understanding of its own location may assist MAP 1 in determining the location of MAP 1. In other words, it is not always the last node in the chain (e.g., the node furthest removed from GPS) that has the least reliable understanding of its own location. For example, MAP 2 may have a relatively highly reliable determination of its location based on proximity to Sensor 2 at a known location, based on a plurality of other MAPs telling MAP 2 where they think MAP 2 is located, based on machine-vision recognition of a landmark, based on an operator inputting information to MAP indicating exactly where MAP 2 is located, etc.

Note that, as with block 815 and 825, block 835 may comprise enhancing the position determination based on information from any of a variety of sensors.

Continuing the example scenario 900D, MAP 1 (at time t4) is out of contact with the fixed infrastructure. For example, there is no current communication pathway to/from the backbone through intermediate fixed or mobile APs. In this scenario, MAP 1 and MAP 2 may communicate with each other, may communicate with the sensors, may communicate with user devices, etc., but may not communicate with the outside world. In this scenario 900D, since MAP 1 will soon depart MAP 2 and head back toward the tunnel entrance, MAP 1 may collect and store information from Sensor 1, MAP 2 (e.g., User 2, Sensor 2, etc.) for the communication of such information upstream when the opportunity arises. Similarly, MAP 2 may collect and store information from MAP 1, etc.

At block 845, for example in a scenario in which a Mobile AP has no access to GPS, has no access to fixed network signals, has no access to signals from other mobile APs, etc., the Mobile AP may determine its location vector based on known waypoints and based on any of a variety of sensor signals. For example, a mobile AP may know a baseline location based on a recent location determination (e.g., at block 815, 825, 835, etc.), and then maintain an estimated position vector from such location based on sensor readings (e.g., wheel rotation counters and encoders, gyroscope sensors, accelerometers, velocity sensors, vibration sensor, video sensors, pressure sensors (e.g., for depth, etc.), magnetic proximity sensors, sound sensors, etc.). Block 845 may, for example, comprise tracking position of the MAP (and/or of other users, devices, MAPs, tools, and other resources) in such manner until a relatively more reliable location determination can be made, at which point the location can be reliably identified and the locally maintained location vector reset. Such operation may, for example, be performed by MAP 2 in the example scenario 900A of FIG. 9A when MAP 2 is out of contact with GPS, the Fixed AP infrastructure, and other Mobile APs.

In an example implementation, the MAP may be communicatively coupled to the vehicle control system (e.g., of an autonomous vehicle, of a remotely controlled vehicle, of a semi-autonomous vehicle, of a manually controlled vehicle, etc.) to determine where the vehicle control system believes the vehicle is located (e.g., based on known landmarks, based on sensor readings, based on planned travel route, etc.).

After any of blocks 815, 825, 835, and 845, execution flow of the example method 800 returns to block 810 for continued determination of the availability of GPS and other information sources.

Figure 9E:
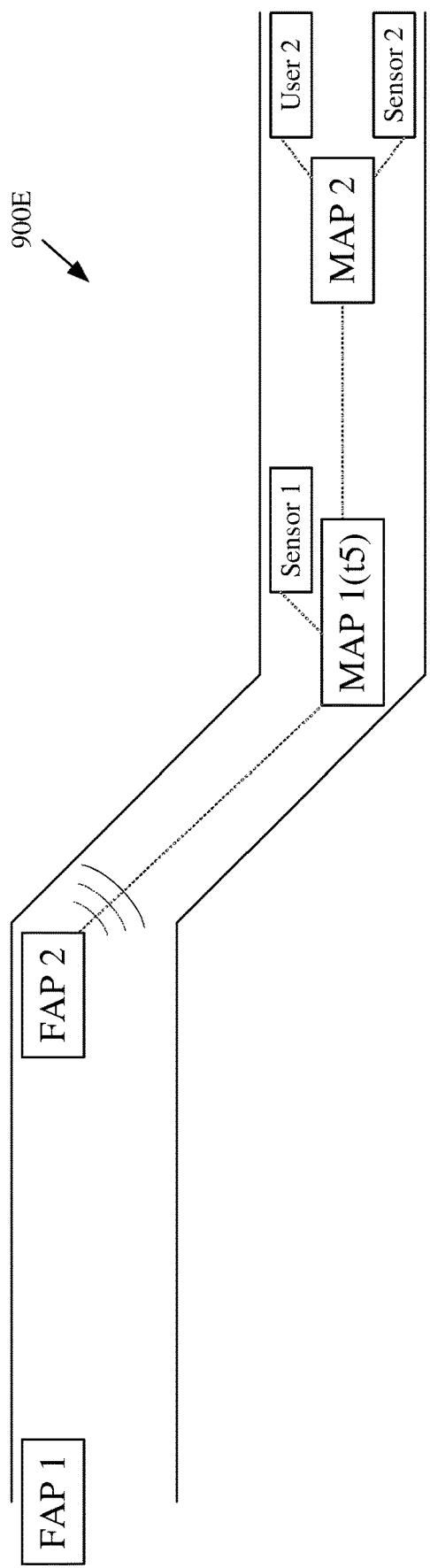

Continuing with the example scenario 900E of FIG. 9E, MAP 1 (at time t5) heads back out of the tunnel and re-establishes communication with FAP 2. At this point, MAP 1 may act as an intermediate hop for communication between FAP 2 and MAP 2. Additionally, MAP 1 may communicate data to FAP 2 (and to the backbone) that MAP 1 has been storing (e.g., for itself, for MAP 2, etc.) while out of contact with the fixed AP infrastructure. As MAP 1 continues its journey out of the tunnel, MAP 1 will eventually lose contact with MAP 2, and MAP 2 will resume its activities as at time t2 (e.g., with no direct or multi-hop communication link to the outside world).

Note that MAP 1 may, in various scenarios, park at the position shown in FIG. 9E to complete a communication occurring between FAP 2 and MAP 2 using MAP 1 as an intermediate node. For example, a relatively high priority real-time communication may be occurring between User 2 and a web server (e.g., a UMNS, a telephone call, etc.), which is important enough to warrant stopping MAP 1 at the appropriate location to serve as an intermediate node. MAP 1 may autonomously make the determination to operate in this manner and/or a UMNS may make such a determination. Many non-limiting examples of such operation are presented in U.S. patent application Ser. No. 15/789,778, filed on Oct. 20, 2017, and titled "Systems and Methods for Utilizing Mobile Access Points as Fixed Access Points in a Network of Moving Things, for Example Including Autonomous Vehicles," the entire contents of which are hereby incorporated herein by reference.

As discussed herein, a network implemented in accordance with various aspects of this disclosure may comprise both mobile nodes (e.g., Mobile APs or OBUs), installed on vehicles and responsible for bridging the provided services with the end user(s) and/or sensor(s), as well as fixed (or physical) infrastructure (e.g., Fixed APs, etc.), responsible for managing the core network services. For example, due to the lack of available fixed (or physical) network infrastructure in various scenarios, infrastructure APs may operate with only one Internet link on the edge, creating a wireless backhaul with a relay chain through multiple Fixed APs, until reaching the vehicles (or Mobile APs), which may then add one or more nodes to the relay chain.

For example, in an example implementation, to provide network connectivity in underground environments where there is no available physical infrastructure, the topology may comprise the various characteristics. For example, a Fixed AP may be positioned at access entrances (e.g., at tunnel entrances, elevator doors, underground parking garage ramps, etc.) and connected to the Internet through physical network infrastructure. Within the tunnel (or other structure), additional Fixed APs may be placed within range of each other (peer-to-peer) creating a relay-chain (e.g., a wireless mesh, which may for example be ad hoc). Since the wireless coverage may be highly dependent on the surrounding environment, the end goal may for example comprise achieving a suitable trade-off between the amount of physical (or hard-wired or fixed location) infrastructure and network performance. For example, each Fixed AP may able to automatically measure the link from the previous AP in the chain and inform the user (installer) about its current performance and expected link extension from its current location (e.g., based on the previous link capability), optimizing this way the number of deployed units.

Also, in the example implementation, a Mobile AP (or OBU) may be installed on each vehicle of the fleet, dotting them with advanced capabilities. Such capabilities may, for example include the ability to capture rich actionable data about the vehicle as well as the surrounding environment such as vehicle operational sensor, environmental sensors, etc. Such capabilities may also, for example, comprise the ability to allow wireless communications through different technologies, including mesh-enabled DSRC, LTE, Wi-Fi and Bluetooth for safety, infotainment or software updating over-the-air. Such capabilities may further, for example, comprise the ability to act as a unique gateway for in-vehicle data (third-party systems) through REST APIs (e.g., Representational State Transfer APIs) or other communication mediums (e.g., Ethernet, wireless, etc.). Such capabilities may additionally, for example, provide for the flow of any or all of the traffic generated from the user to the Internet, passing through the chain of APs, providing a low-latency communication path among the execution team and the other stakeholders (through Web-based reports or real-time triggers).

As discussed herein, as Mobile APs move in and out of coverage in an underground (or other) scenario, the communication environment may be mapped. For example, as new tunnels are formed and old tunnels are closed or less used, the communication needs will dynamically change. The Mobile APs may thus track the dynamically changing network topology and communication needs and provide insight into where Fixed APs should be installed. For example, if a Mobile AP regularly returns to communication with the fixed (or physical) infrastructure with relatively large amounts of data, or regularly remains out of touch of the fixed infrastructure for a time duration that is deemed unsafe or inefficient, the location of the Mobile AP may be processed to identify the location at which a next Fixed AP may be positioned. For example, referring to FIG. 9E, if MAP 1 (and/or other MAPs) routinely resumes contact with FAP 2 with a substantial amount of data (e.g., above a threshold amount, etc.) and/or with high-priority data (e.g., above a threshold priority and/or amount, etc.) that would otherwise have been communicated in real-time, it may be determined (e.g., by a UNMS or other node(s)) to install a FAP at the MAP 1 position shown in FIG. 9E. Also for example, data latency for different types of data (e.g., with different respective priorities, etc.) may be monitored (e.g., and compared to one or more respective thresholds, etc.) to determine when to install a FAP. Note that with the enhanced location-determination capability of the network (or system) disclosed herein, an accurate map of dead zones and/or their respective importance may be formed.

Additionally, if it is observed that too many MAP hops are being utilized (e.g., above a threshold) for communication in an area, it may be determined (e.g., by a UNMS or other node(s)) to install a FAP. Note that such a determination may also depend on the expected number of MAPs in an area. If a relatively large number of MAPs are expected to be serving a particular area, a communication solution utilizing a large number of MAP hops may be deemed sufficient, at least until it is expected that the number of MAPs serving the particular area may be declining (e.g., below a target threshold, etc.).

Further, if it is observed that MAPs rarely (e.g., below a usage threshold, etc.) are utilizing a particular FAP for communication, such FAP may be flagged for further removal (or relocation) or potential removal (or relocation) pending further investigation.

For example, considering the underground workflow nature where the physical layout and/or the utilization thereof is constantly increasing (due to expanding operations) or decreasing (due to discontinuing various operations), a completely fixed infrastructure deployment can become restrictive and/or react too slowly to the changing conditions. However, when a network is implemented in accordance with various aspects of the present disclosure (e.g., as a fixed relay chain and/or flexible mesh), increasing the underground environment layout may for example be performed by monitoring network operation and placing Fixed APs (e.g. with only a local power source, etc.) in accordance with placement guidelines and the wireless survey that the network (e.g., one or more Mobile APs, a UNMS, etc.) conducts.

In general, for example, a network implemented in accordance with various aspects of the present disclosure utilizes vehicles (or Mobile APs) as mobile connectivity gateways for providing the last-mile communication in order to flexibly expand the fixed infrastructure wireless backhaul as needed.

Such a network may flexibly provide any of a variety of services and applications, non-limiting examples of which have been presented and additional non-limiting examples of which will next be presented.

For example, a network implemented in accordance with various aspects of this disclosure may enhance worker safety. For example, gaining insight about what is occurring hundreds of meters below provides for making more informed decisions, for example, for documentation and planning (e.g., adapting operation in accordance with an ever-changing layout), for daily control of users and other resources, reducing reliance on manual head-counting and user identification, for decreasing response time in emergency situations, etc.

As discussed herein, a network implemented in accordance with various aspects of this disclosure provides for enhanced asset tracking and location services. Such assets, for example, include human assets, material assets, vehicle assets, tool assets, sensor assets, fuel assets, etc. For example, as explained herein, since GPS services might not be available in various environments (e.g., in underground environments, etc.), various aspects of communication network signals (e.g., Fixed AP signals, Mobile AP signals, sensor signals, user device signals, etc.) may be leveraged to track assets reliably without the utilization of GPS. For example, by equipping every vehicle with a Mobile AP, the position of the vehicle (and/or of all assets associated with the vehicle) may be extrapolated based, at least in part, on its connection to one or more Fixed APs. For example, location may be mapped with the signals of neighboring Fixed APs.

As discussed herein, a network implemented in accordance with various aspects of this disclosure may be utilized to track non-human assets, for example vehicle assets, etc. Another example of such tracking may include elevator tracking. In an example implementation, as with a motor vehicle (e.g., a manually driven vehicle, an autonomous vehicle, etc.), an elevator may also be equipment with a Mobile AP. Additionally, rotational encoders, pressure sensors, laser range-finders, etc. may be utilized to tracking elevator location. Note that in an example implementation, the elevator control system may be integrated with the communication network to provide elevator position vector information. Such tracking may, for example, be useful in scenarios involving many levels of tunnels. For example, the location vector from the upper surface of a mining structure to a particular level (or gallery) may be an important part of the location vector chain.

Additional service enhancements provided by a network implemented in accordance with various aspects of the present disclosure include data management service enhancements. For example, such a network may provide for enhanced data generation, for example fleet telematics (e.g., traveled distance/path, performed trips, fuel consumption, vehicle operational data, load transported, emissions tracking, etc.), network information (e.g., number of concurrent users, traffic, etc.), etc. Also for example, such a network may provide for enhanced data collection, for example through multiple interfaces (e.g., 802.11, Ethernet, Bluetooth, etc.) using available APIs. Many examples of such data collection (e.g., from sensors by which a Mobile AP is passing, from other Mobile AP, etc.) and communication are provided in U.S. patent application Ser. No. 15/213,269, filed on Jul. 18, 2016, and titled "Systems and Methods for Collecting Sensor Data in a Network of Moving Things"; and U.S. patent application Ser. No. 15/682,886, filed Aug. 22, 2017, and titled "Systems and Methods for Multi-Vehicle Adaptive Data Collection in a Network of Moving Things, for Example Including Autonomous Vehicles"; the entire contents of each of which are incorporated herein by reference.

Additionally for example, such a network may provide for enhanced data delivery, for example, providing client flexibility to determine (and specify) the maximum data delivery time allowed for each data type. Also for example, through cache & forward mechanisms, the Mobile AP is able to hold (or carry) the information at least a minimum required amount of time before sharing the information with another vehicle or to the nearest Fixed AP, avoiding data losses on the way. Many examples of such communication (e.g., delay tolerant communication, real-time communication, etc.) are provided in U.S. patent application Ser. No. 15/633,201, filed on Jun. 26, 2017, titled "Systems and Methods for Multiple-Path Delay Tolerant Communication in a Network of Moving Things, for Example Including a Network of Autonomous Vehicles," the entire contents of which are hereby incorporated herein by reference.

Further service enhancements provided by a network implemented in accordance with various aspects of the present disclosure may comprise connectivity enhancements. For example, a combination of Fixed APs and Mobile APs may be utilized to form a relay chain (e.g., utilizing mesh technology, etc.) for communicating information between the user and the Internet without requiring a physical (e.g., hard-wired, tethered optical, etc.) network infrastructure on all of the APs. This type of connectivity may, for example, be used for both internal communications and intranet access to corporate services, as the workers will be able to access and deliver in real time crucial information for the day-to-day activities management.

Still further service enhancements provided by a network implemented in accordance with various aspects of the present disclosure may comprise safety enhancements. For example, by deploying Fixed and/or Mobile APs, the safety of the surrounding environment can be enhanced. For example, APs (e.g., utilizing on-board sensors and/or off-board sensors) are able to perform motion monitoring on the physical environment. For example, with the vibration sensors on the APs (or at least communicatively coupled to the APs), such APs are able to measure the physical environment (or infrastructure) vibration changes, for example triggering events under critical situations. Other events may, for example, include gas events (e.g., the detection of poisonous gases, the detection of oxygen levels that are too low, etc.). Such events may, for example, be utilized by the operation manager to initiate corporate safety actions. Such events may also, for example, be presented to all nearby workers (e.g., presented on a warning splash screen) to expeditiously (e.g., within milliseconds, tens of milliseconds, etc.) inform the workers of a critical safety condition from which the workers are to immediately move away.

Yet further service enhancements provided by a network implemented in accordance with various aspects of the present disclosure may comprise operational efficiency improvements. Such operational efficiency improvements may, for example, result from increased communication between workers and controllers (e.g., providing real-time communication or near-real-time communication, providing for ad hoc information gathering in real-time, providing for efficiency generation and communication of reports, provided for real-time web form communication between workers and controllers, etc.), increased insight into worker, vehicle and other asset location, increased insight into potential safety concerns before such potential concerns materialize, etc.

In general, a network implemented in accordance with various aspects of the present disclosure may fill various technology gaps in challenging operating environments, overcome most if not all of the technological constraints. A full-stack solution is offered that provides for reliable data management (e.g., providing a unique data gateway for collected data and existing third-party systems, providing concurrent data delivery methods (DTN, V2V, V2I, real-time, etc.), etc.), provides for safety enhancement (e.g., human asset location, reliable communication connectivity, infrastructure monitoring (tunnels, galleries, etc.), etc.), provides for cost-effective communication through a mesh network (e.g., DTN for non-critical information, real-time communication for critical services, etc.), provides for incremental infrastructure deployment in an autonomous way (e.g., cases where tunnels/galleries are growing over time or otherwise changing, coverage detection, etc.), provides for enhanced operational efficiency (e.g., real-time communication when needed, web-form download/upload reporting for ad hoc and end-to-end daily activities stakeholders, etc.).

Figure 10:
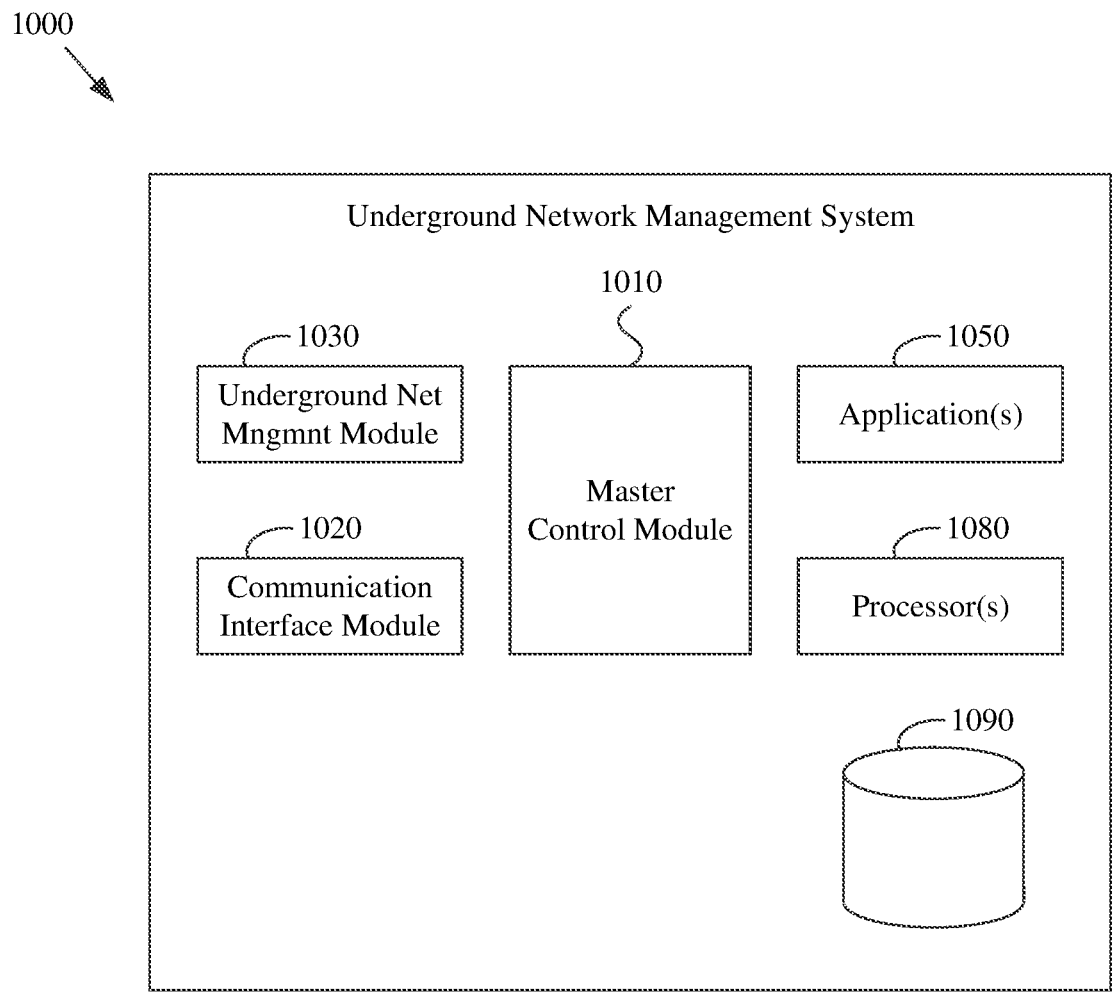
FIG. 10 shows a block diagram of an example Underground Network Management System, in accordance with various aspects of the present disclosure.

As discussed herein, any or all of the operations discussed herein may be performed in any of the nodes discussed herein, or in any combination of the nodes discussed herein. FIG. 10 provides an example of an Underground Network Management System 1000 (UNMS), in accordance with various aspects of the present disclosure. The example UNMS 1000 may, for example, share any or all characteristics with the other example methods, method steps, nodes, networks, and/or network components 100, 200, 300, 400, 500-570, 600, 700, 800, 900, 1100, and 1200, shown and/or discussed herein. For example, any or all of the components of the example UNMS 1000 may perform any or all of the method steps presented herein (e.g., of the method 800 of FIG. 8, etc.). Also for example, the UNMS 1000 may share any or all characteristics with the UNMS 790 of FIG. 7. The UNMS 1000, or any portion thereof, may for example be performed in a web server, network operation center (NOC), network controller (NC), etc.

As discussed herein, although the example UNMS 1000 is presented here in the context of a central (e.g., cloud-based) controller (or server or NOC), it should be understood that any or all aspects of the example UNMS 1000 may be implemented in any (or any combination) of the nodes discussed herein. For example, in an example implementation, the example UNMS 1000 may be implemented in a distributed manner among the Mobile APs and/or Fixed APs and/or Cloud servers of the vehicle network.

The example UNMS 1000 may, for example, comprise a Communication Interface Module 1020 that operates to perform any or all of the wireless and/or wired and/or optical tethered communication functionality for the example UNMS 1000, many examples of which are provided herein (e.g., communication with databases, communication with shipping control systems, communication with fleet controllers, communication with Fixed AP nodes, communication with Mobile AP nodes, communication with cellular (or other) base stations, landline communication, communication with the Cloud APIs or other entities, backhaul communication, communication with client dashboards or controllers, communication with shipping container sensors, communication with sensors in general, etc.). The Communication I/F Module 1020 may, for example, operate in accordance with any of a variety of cellular communication protocols (e.g., 3G, 4G, LTE, etc.), wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), POTS communication, etc. For example, any of the example communication discussed herein between a UNMS and a Mobile AP, between a UNMS and a Fixed AP, between a UNMS and a backhaul network, between a UNMS and a local service controller, etc., may be performed utilizing the Communication I/F Module 1020.

The example UNMS 1000 also comprises an Underground Network Management Module 1030 that, for example, performs any or all of the AP (or vehicle) position and/or communication control functionality discussed herein (e.g., with regard to the example method 800 of FIG. 8, with regard to the example scenarios 900A-900E of FIGS. 9A-9E, etc.). The Underground Network Management Module 1030 may, for example, utilize communication services provided by the Communication Interface Module 1020 to perform various aspects of communication.

The example UNMS 1000 may, for example, comprise a Master Control Module 1010 that generally manages operation of the UNMS 1000 at a high level. Such Master Control Module 1010 may, for example, comprise various aspects of an operating system for the UNMS 1000.

The example UNMS 1000 may further, for example, comprise one or more Applications 1050 executing on the UNMS 1000 (e.g., network performance analyzing application, vehicle movement application, vehicle communication applications, vehicle control applications, sensor interface applications, safety situation detection and communication applications, location tracking applications, traffic control applications, client management applications, security applications, power management applications, vehicle monitoring applications, location services applications, user interface applications, etc.).

The example UNMS 1000 may also comprise one or more Processors 1080 and Memory Devices 1090. The Processor(s) 1080 may, for example, comprise any of a variety of processor characteristics. For example, the Processor(s) 1080 may comprise one or more of a general purposes processor, RIS processor, microcontroller, ASIC, DSP, video processor, co-processor, etc.). The Memory Device(s) 1090 may, for example comprise any of a variety of memory characteristics. For example, the Memory Device(s) 1090 may comprise a volatile memory, non-volatile memory, etc. The Memory Device(s) 1090 may, for example, comprise a non-transitory computer-readable medium that comprises software instructions that when executed by the Processor(s) 1080, cause the UNMS 1000 to perform any or all of the functionality discussed herein (e.g., vehicle movement or control functionality, safety functionality, asset tracking functionality, mobility management functionality, communication functionality, etc.).

Figure 11:
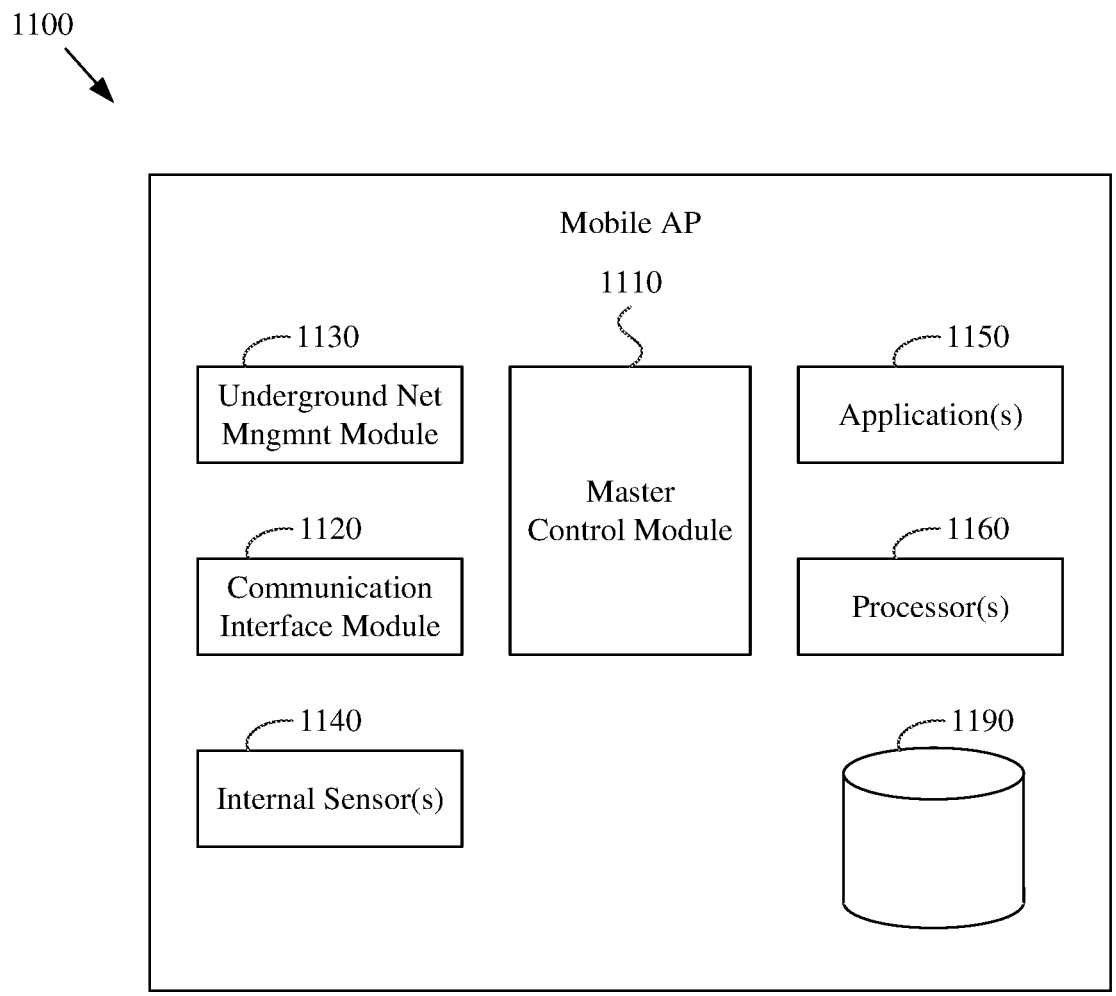
FIG. 11 shows a block diagram of an example mobile access point, in accordance with various aspects of the present disclosure.

FIG. 11 shows a block diagram of an example mobile access point, in accordance with various aspects of the present disclosure. The example Mobile AP 1100 may, for example, share any or all characteristics with the other example methods, method steps, nodes, networks, and/or network components 100, 200, 300, 400, 500-570, 600, 700, 800, 900, and 1000, shown and/or discussed herein. For example, any or all of the components of the example Mobile AP 1100 may perform any or all of the method steps presented herein, for example with regard to a Mobile AP, with regard to the example method 800 of FIG. 8, with regard to the example scenarios 900A-900E of FIGS.

9A-9E, etc. Note that the Mobile AP 1100 may also be referred to herein as an OBU.

The example Mobile AP 1100 may, for example, comprise a Communication Interface Module 1120 that operates to perform any or all of the wireless and/or wired communication functionality for the Mobile AP 1100, many examples of which are provided herein (e.g., communication with AP Positioning Systems, communication with Cloud databases, communication with sensors, communication with local navigation systems of vehicles or Mobile APs, communication with NCs, communication with Fixed AP nodes, communication with Mobile AP nodes, communication directly with client devices, backhaul or cellular communication, communication with UNMS servers, etc.). The Communication I/F Module 1120 may, for example, operate in accordance with any of a variety of cellular communication protocols (e.g., 3G, 4G, LTE, etc.), wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), etc. For example, any of the example communication discussed herein between a Mobile AP and a UNMS server, between a Mobile AP and an NC, between a Mobile AP and a Fixed or Mobile AP, between a Mobile AP and a sensor, between a Mobile AP and a Cloud database, between a Mobile AP and a user device, etc., may be performed utilizing the Communication Interface Module 1120.

The example Mobile AP 1100 also comprises an Underground Network Management Module 1130 that, for example, operates to perform any or all of the MAP (or vehicle) movement control, communication, tracking, and/or safety functionality (e.g., including sensor data collection, analysis, communication, etc.; the communication of control information; etc.) discussed herein (e.g., with regard to the example method 800 of FIG. 8, with regard to the example scenarios 900A-900E of FIGS. 9A-9E, etc.). The Underground Network Management Module 1130 may, for example, utilize communication services provided by the Communication Interface Module 1120 to perform various aspects of communication.

The example Mobile AP 1100 may, for example, comprise a Master Control Module 1210 that generally manages operation of the Mobile AP 1100 at a high level. Such Master Control Module 1110 may, for example, comprise various aspects of an operating system for the Mobile AP 1100.

The example Mobile AP 1100 may further, for example, comprise one or more Applications 1150 executing on the Mobile AP 1100 (e.g., MAP or vehicle position control applications, sensor interface applications, client management applications, security applications, power management applications, vehicle monitoring applications, location services and/or asset tracking applications, user interface applications, etc.).

The example Mobile AP 1100 may also comprise one or more Processors 1160 and Memory Devices 1190. The Processor(s) 1160 may, for example, comprise any of a variety of processor characteristics. For example, the Processor(s) 1160 may comprise one or more of a general purpose processor, RIS processor, microcontroller, ASIC, DSP, video processor, co-processor, etc. The Memory Device(s) 1190 may, for example comprise any of a variety of memory characteristics. For example, the Memory Device(s) 1190 may comprise a volatile memory, non-volatile memory, etc. The Memory Device(s) 1190 may, for example, comprise a non-transitory computer-readable medium that comprises software instructions that when executed by the Processor(s) 1160, cause the Mobile AP 1100 to perform any or all of the functionality discussed herein (e.g., MAP or vehicle position control functionality, sensor interface functionality, mobility management functionality, communication functionality, user interface functionality, etc.).

Note that the example Mobile AP 1100 may also be a Fixed AP (or base station), in which case, the modules operate to perform any or all of the functionality discussed herein with regard to Fixed APs and/or base stations. Also note that the example Mobile AP 1100 may be implemented in any of the communication network nodes discussed herein (e.g., Cloud nodes, backbone network nodes, vehicle network nodes, client or user devices, etc.).

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for providing underground services in a network of moving things, for example but not necessarily including autonomous vehicles. As a non-limiting example, various aspects of this disclosure provide communication network architectures, systems, and methods for providing communication services, location services, safety services, vehicle guidance services, etc., in underground or other environments in which direct communication with entities outside such environment is not possible. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A Mobile Access Point (MAP) for providing underground services in a network of moving things, the MAP comprising:
   a plurality of wireless transceivers operable to provide wireless communication between the MAP and a vehicle communication network, and to provide wireless local area network (WLAN) access point services; and
   at least one module comprising a processor and memory, wherein the at least one module is operable to, while traveling underground, at least:
      communicate with a Fixed Access Point (FAP) infrastructure;
      while communicating with the FAP infrastructure and without having access to a global positioning system, at least:
         receive a first signal from the FAP infrastructure;
         determine a first location of the MAP based, at least in part, on the received first signal; and
         communicate the determined first location to an Underground Network Management System (UNMS) via the FAP infrastructure;
      lose contact with the FAP infrastructure;
      while contact with the FAP infrastructure is lost and without having access to a global positioning system, at least:
         communicate with a second Mobile Access Point (MAP);
         receive a second signal from the second MAP; and
         determine a second location of the MAP based, at least in part, on the received second signal; and
      communicate location information based at least in part on the determined second location to the UNMS.

2. The Mobile Access Point (MAP) of claim 1, wherein the received second signal from the second MAP comprises information indicating a location of the second MAP.

3. The Mobile Access Point (MAP) of claim 2, wherein the at least one module is operable to communicate the location of the second MAP to the UNMS.

4. The Mobile Access Point (MAP) of claim 1, wherein the at least one module is operable to determine the second location of the MAP based, at least in part, on signal strength of a signal communicated with the second MAP.

5. The Mobile Access Point (MAP) of claim 1, wherein the at least one module is operable to determine the second location of the MAP based, at least in part, on planned vehicle route information.

6. The Mobile Access Point (MAP) of claim 1, wherein the at least one module is operable to determine the second location of the MAP based, at least in part, on communication with an off-vehicle sensor at a known location.

7. The Mobile Access Point (MAP) of claim 1, wherein the at least one module is operable to determine the second location of the MAP based, at least in part, on a movement sensor.

8. The Mobile Access Point (MAP) of claim 1, wherein the at least one module is operable to determine a user location of a user and/or user device, and the communicated location information comprises information of the user location.

9. The Mobile Access Point (MAP) of claim 1, wherein the at least one module is operable to determine a resource location of an off-vehicle non-personnel resource, and the communicated location information comprises information of the resource location.

10. The Mobile Access Point (MAP) of claim 1, wherein the at least one module is operable to determine whether to delay communication of the location information.

11. A Mobile Access Point (MAP) for providing underground services in a network of moving things, the MAP comprising:
   a plurality of wireless transceivers operable to provide wireless communication between the MAP and a vehicle communication network, and to provide wireless local area network (WLAN) access point services; and
   at least one module comprising a processor and memory, wherein the at least one module is operable to, while traveling underground, at least:

communicate with a Fixed Access Point (FAP) infrastructure;
while communicating with the FAP infrastructure and without having access to a global positioning system, at least:
receive a first signal from the FAP infrastructure;
determine a first location of the MAP based, at least in part, on the received first signal; and
communicate the determined first location to an Underground Network Management System (UNMS) via the infrastructure;
lose contact with the FAP infrastructure;
while contact with the FAP infrastructure is lost and without having access to a global positioning system, at least:
communicate with an underground sensor and/or underground user device positioned along an underground travel route of the MAP;
receive at least a second signal from the underground sensor and/or underground user device; and
determine a second location of the MAP based, at least in part, on the received at least a second signal; and
communicate location information based at least in part on the determined second location to the UNMS.

12. The Mobile Access Point (MAP) of claim 11, wherein the underground sensor is at a location known to the at least one module.

13. The Mobile Access Point (MAP) of claim 12, wherein the second signal comprises information indicating a location of the underground sensor.

14. The Mobile Access Point (MAP) of claim 11, wherein the underground sensor comprises a camera and/or microphone.

15. The Mobile Access Point (MAP) of claim 11, wherein the at least one module is operable to determine the second location of the MAP based, at least in part, on strength of a signal communicated with the underground sensor and/or underground user device.

16. The Mobile Access Point (MAP) of claim 11, wherein the at least one module is operable to determine the second location of the MAP based, at least in part, on planned vehicle route information.

17. A Mobile Access Point (MAP) for providing underground services in a network of moving things, the MAP comprising:
a plurality of wireless transceivers operable to provide wireless communication between the MAP and a vehicle communication network, and to provide wireless local area network (WLAN) access point services; and
at least one module comprising a processor and memory, wherein the at least one module is operable to, while traveling underground, at least:
communicate with a Fixed Access Point (FAP) infrastructure;
while communicating with the FAP infrastructure and without having access to a global positioning system, at least:
receive a first signal from the FAP infrastructure;
determine a first location of the MAP based, at least in part, on the received first signal; and
communicate the determined first location to an Underground Network Management System (UNMS) via the FAP infrastructure;
lose contact with the FAP infrastructure;
while contact with the FAP infrastructure is lost and without having access to a global positioning system, at least:
communicate with a second Mobile Access Point (MAP);
receive a second signal from the second MAP;
communicate with an underground sensor and/or underground user device positioned along an underground travel route of the MAP;
receive at least a third signal from the underground sensor and/or underground user device;
determine a second location of the MAP based, at least in part, on the received second signal and on the received at least a third signal; and
communicate location information based, at least in part, on the determined second location to the UNMS.

18. The Mobile Access Point (MAP) of claim 17, wherein the received second signal from the second MAP comprises information indicating a location of the second MAP.

19. The Mobile Access Point (MAP) of claim 18, wherein the at least one module is operable to communicate the location of the second MAP to the UNMS.

20. The Mobile Access Point (MAP) of claim 17, wherein the at least one module is operable to communicate with a control system of an autonomous vehicle to which the MAP is coupled.

* * * * *